(12) United States Patent
Liu et al.

(10) Patent No.: US 12,035,184 B2
(45) Date of Patent: Jul. 9, 2024

(54) ELECTRONIC DEVICE, COMMUNICATION METHOD AND STORAGE MEDIUM

(71) Applicant: Sony Group Corporation, Tokyo (JP)

(72) Inventors: Wendong Liu, Beijing (CN);
Zhaocheng Wang, Beijing (CN);
Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 480 days.

(21) Appl. No.: 17/414,323

(22) PCT Filed: Jan. 31, 2020

(86) PCT No.: PCT/CN2020/074089
§ 371 (c)(1),
(2) Date: Jun. 16, 2021

(87) PCT Pub. No.: WO2020/156503
PCT Pub. Date: Aug. 6, 2020

(65) Prior Publication Data
US 2022/0038970 A1     Feb. 3, 2022

(30) Foreign Application Priority Data
Feb. 2, 2019   (CN) .......................... 201910105935.9

(51) Int. Cl.
*H04W 36/00*   (2009.01)
*H04B 7/155*   (2006.01)
(Continued)

(52) U.S. Cl.
CPC .... *H04W 36/0083* (2013.01); *H04B 7/15557* (2013.01); *H04W 36/08* (2013.01);
(Continued)

(58) Field of Classification Search
None
See application file for complete search history.

(56) References Cited

U.S. PATENT DOCUMENTS 6,470,177 B1 * 10/2002 Andersson ........... H01Q 3/2605
455/91
6,681,112 B1 *  1/2004 Schwarz ............... H04W 36/06
455/436
(Continued)

FOREIGN PATENT DOCUMENTS

CN          108934030 A       12/2018

OTHER PUBLICATIONS

Huawei: "Overview consideration on RANI IAB aspects", 3GPP; R2-1812758 (revision of R2-1810695), Overview Consideration on RANI IAB Aspects, vol. RAN WG2, Aug. 24, 2018.
(Continued)

*Primary Examiner* — Gregory B Sefcheck
(74) *Attorney, Agent, or Firm* — XSENSUS LLP

(57) ABSTRACT

An electronic device on side of user equipment, with an access link between the user equipment and a first node of an integrated access and backhaul (IAB) system, there being a backhaul link between the first node and a second node of the IAB system, wherein the second node is a parent node of the first node in network topology of the IAB system, characterized in that the electronic device includes: processing circuitry that measures a signal inference from a third node; reports an interference measurement to the first node; and in a case where the second node makes a determination to switch the access link used by the user equipment based at least in part on the interference measurement exceeding a predetermined threshold, establishes a direct access link
(Continued)

between the user equipment and the second node and disconnect the access link between the user equipment and the first node.

14 Claims, 22 Drawing Sheets

(51) Int. Cl.
  *H04W 36/08* (2009.01)
  *H04W 36/30* (2009.01)
  *H04W 72/23* (2023.01)
  *H04W 76/10* (2018.01)
  *H04W 76/30* (2018.01)
(52) U.S. Cl.
  CPC ........... *H04W 36/30* (2013.01); *H04W 72/23* (2023.01); *H04W 76/10* (2018.02); *H04W 76/30* (2018.02)

(56) References Cited

U.S. PATENT DOCUMENTS

| | | | |
|---|---|---|---|
| 10,492,092 B2* | 11/2019 | Kim | H04L 5/005 |
| 11,122,570 B2* | 9/2021 | Chae | H04W 72/02 |
| 2007/0213011 A1 | 9/2007 | Kim et al. | |
| 2011/0090808 A1* | 4/2011 | Chen | H04W 28/18 |
| | | | 370/252 |
| 2011/0110251 A1* | 5/2011 | Krishnamurthy | H04W 72/541 |
| | | | 370/252 |
| 2012/0028627 A1 | 2/2012 | Hunzinger | |
| 2012/0113961 A1* | 5/2012 | Krishnamurthy | H04L 1/203 |
| | | | 370/332 |
| 2012/0122472 A1* | 5/2012 | Krishnamurthy | H04L 5/0053 |
| | | | 455/456.1 |
| 2013/0033998 A1* | 2/2013 | Seo | H04W 24/10 |
| | | | 370/252 |
| 2013/0223324 A1 | 8/2013 | Somasundaram et al. | |
| 2013/0242931 A1* | 9/2013 | Bi | H04W 72/20 |
| | | | 370/329 |
| 2013/0322322 A1* | 12/2013 | Redana | H04W 52/244 |
| | | | 370/315 |
| 2014/0016542 A1 | 1/2014 | Ulupinar et al. | |
| 2014/0301360 A1* | 10/2014 | Bontu | H04W 36/32 |
| | | | 370/331 |
| 2014/0307586 A1* | 10/2014 | Zhang | H04W 88/04 |
| | | | 370/254 |
| 2015/0105085 A1* | 4/2015 | Tseng | H04W 36/04 |
| | | | 455/444 |
| 2015/0181498 A1* | 6/2015 | Li | H04W 36/0058 |
| | | | 455/437 |
| 2015/0327201 A1* | 11/2015 | He | H04W 56/0025 |
| | | | 370/336 |
| 2015/0365994 A1* | 12/2015 | Yu | H04W 72/1268 |
| | | | 370/336 |
| 2015/0382268 A1* | 12/2015 | Hampel | H04B 7/0617 |
| | | | 455/436 |
| 2016/0219475 A1* | 7/2016 | Kim | H04W 76/15 |
| 2017/0164375 A1* | 6/2017 | Sundararajan | H04W 72/541 |
| 2017/0289986 A1* | 10/2017 | Jin | G01S 5/0063 |
| 2017/0325243 A1* | 11/2017 | Yasukawa | H04L 5/0048 |
| 2017/0358851 A1* | 12/2017 | Diamond | H01Q 3/08 |
| 2018/0013594 A1* | 1/2018 | Mukkavilli | H04L 5/14 |
| 2018/0152222 A1* | 5/2018 | Yoo | H04B 7/0695 |
| 2018/0213577 A1* | 7/2018 | Burbidge | H04W 76/10 |
| 2019/0098615 A1* | 3/2019 | Wang | H04L 5/0073 |
| 2019/0124631 A1* | 4/2019 | Ren | H04L 5/0048 |
| 2019/0253106 A1* | 8/2019 | Raghavan | H04B 17/382 |
| 2019/0373647 A1* | 12/2019 | Rugeland | H04W 72/0446 |
| 2020/0037385 A1* | 1/2020 | Park | H04W 56/001 |
| 2020/0053723 A1* | 2/2020 | Hosseini | H04W 72/21 |
| 2020/0221532 A1* | 7/2020 | Jung | H04W 76/30 |
| 2020/0259250 A1* | 8/2020 | Diamond | H01Q 21/06 |
| 2021/0152228 A1* | 5/2021 | Liu | H04W 72/21 |
| 2021/0306931 A1* | 9/2021 | Huang | H04W 40/22 |
| 2021/0329540 A1* | 10/2021 | Harada | H04B 7/15528 |
| 2022/0124761 A1* | 4/2022 | Muruganathan | H04W 72/1273 |
| 2022/0311574 A1* | 9/2022 | Gao | H04L 5/0051 |

OTHER PUBLICATIONS

Zte: "Discussion on IAB link switch and topology adaptation", 3GPP, R2-1812467, vol. TSG-RAN WG2#103, Aug. 24, 2018.
International Search Report and Written Opinion dated Apr. 27, 2020, received for PCT Application PCT/CN2020/074089, Filed on Jan. 31, 2020, 8 pages including English Translation.
AT&T, "Route Changes Based on Intra-gNB Handover of IAB Node", 3GPP TSG-RAN WG2 Meeting #103, R2-1812405, Aug. 20-24, 2018, pp. 1-4.
Zte, "Discussion on IAB Topology Adaptation", 3GPP TSG-RAN WG2 NR AdHoc 1807, R2-1810211, Jul. 2-6, 2018, 4 pages.

* cited by examiner (a)

(b)

ELECTRONIC DEVICE, COMMUNICATION METHOD AND STORAGE MEDIUM

CROSS-REFERENCE TO RELATED APPLICATIONS

The present application is based on PCT filing PCT/CN2020/074089, filed Jan. 31, 2020, which claims priority to CN 201910105935.9, filed Feb. 2, 2019, the entire contents of each are incorporated herein by reference.

FIELD OF THE INVENTION

The present disclosure relates to electronic device, communication method, and storage medium. More specifically, the present disclosure relates to electronic device, communication method, and storage medium applicable for multi-user MIMO enhancement in an integrated access and backhaul (IAB) system.

BACKGROUND

As the next generation wireless communication standard, 5G NR (New Radio) takes advantage of a higher frequency band such as millimeter wave frequency band, and applies massive antenna and multi-beam systems so as to provide higher system rate and spectrum efficiency. Massive MIMO technology further expands the use of the spatial domain, while beamforming technology is used to form narrow directional beams to withstand the large path loss in the high-frequency channel. Both of them have become key technologies for the 5G communication.

IAB is an important form of 5G NR network deployment, especially in scenarios where users are densely distributed. Due to the key role of IAB in 5G network deployment and coverage, IAB has become a hot topic in the industry.

FIG. 1 illustrates a schematic diagram of an IAB system. As shown in FIG. 1, an IAB master node (IAB donor) provides a wireless backhaul function to two IAB nodes. A wireless backhaul link can be established between the nodes of the IAB system, and a wireless access link can be established between a node and an access user equipment.

The node in the IAB system supports multi-user MIMO (MU-MIMO) transmission for its access users (including UE and access child nodes). In a single-hop two-tier IAB system shown in FIG. 1, Master Node uses the same time-frequency resources to provide multi-user MIMO service for Child Node 1, Child Node 2 and User 5 in its cell; for the second tier, Child Node 1 and Child Node 2 use the same time-frequency resources to provide multi-user MIMO service for access users in their small cells, for example, Child Node 1 serves UE1 and UE2, and Child Node 2 serves UE3 and UE4.

However, since the same frequency band is used, access users served by a certain child node may experience inter-small-cell interference caused by adjacent child nodes, resulting in a decrease in system performance. For example, in the example shown in FIG. 1, signal interference may occur between the small cells of Child Node 1 and Child Node 2.

In a traditional cell system, adjacent base stations can perform coordinated scheduling of time-frequency resources via, for example, an X2 interface, to avoid scheduling UE2 and UE3 in the same time-frequency resource block; in a millimeter-wave cellular system, adjacent millimeter-wave cellular base stations can perform a joint scheduling in time-frequency domain and beam domain via, for example, an Xn interface, which can also effectively avoid the inter-cell interference. However, the coordinated resource scheduling between adjacent cells requires additional signaling to be transmitted between adjacent base stations, which brings additional overhead, and does not take advantage of the multi-layer structural characteristics of the IAB system.

Therefore, there is a need to provide a multi-user MIMO transmission scheme applicable to the IAB system so as to avoid or reduce the inter-user interference.

SUMMARY OF THE INVENTION

Aspects are provided by the present disclosure to satisfy the above-mentioned need.

A brief overview regarding the present disclosure is given below to provide a basic understanding on some aspects of the present disclosure. However, it will be appreciated that the overview is not an exhaustive description of the present disclosure. It is not intended to specify key portions or important portions of the present disclosure, nor to limit the scope of the present disclosure. It aims at merely describing some concepts about the present disclosure in a simplified form and serves as a preorder of a more detailed description to be given later.

According to one aspect of the present disclosure, there is provided an electronic device on side of user equipment, there being an access link between the user equipment and a first node of an integrated access and backhaul (IAB) system, there being a backhaul link between the first node and a second node of the IAB system, wherein the second node is a parent node of the first node in network topology of the IAB system, characterized in the electronic device comprising: a processing circuitry configured to: measure a signal inference from a third node; report an interference measurement to the first node; and in a case where the second node makes a determination to switch the access link used by the user equipment based at least in part on the interference measurement exceeding a predetermined threshold, establish a direct access link between the user equipment and the second node and disconnect the access link between the user equipment and the first node.

According to one aspect of the present disclosure, there is provided an electronic device for a node in an integrated access and backhaul (IAB) system, the node being referred to as the first node, there being an access link between the first node and user equipment, there being a backhaul link between the first node and a second node of the IAB system, where the second node is a parent node of the first node in network topology of the IAB system, characterized in the electronic device comprising: a processing circuitry configured to: receive, from the user equipment, an interference measurement of signal interference from a third node; in a case where the second node makes a determination to switch the access link used by the user equipment based at least in part on the interference measurement exceeding a predetermined threshold, receive from the second node an instruction to disconnect the access link between the first node and the user equipment, and disconnect the access link between the first node and the user equipment.

According to one aspect of the present disclosure, there is provided an electronic device for a node in an integrated access and backhaul (IAB) system, the node being referred to as a second node, there being a backhaul link between a first node and the second node of the IAB system, wherein the first node is a child node of the second node in network topology of the IAB system, and there is an access link between the user equipment and the first node, characterized in the electronic device comprising a processing circuitry configured to: makes a determination to switch the access link used by the user equipment based at least in part on an interference measurement of signal interference from a third node by the user equipment exceeding a predetermined threshold; and in response to the determination, establish a direct access link between the second node and the user equipment and instruct the first node to disconnect the access link between the first node and the user equipment.

According to one aspect of the present disclosure, there is provided an electronic device for a node in an integrated access and backhaul (IAB) system, the node being referred to as a second node, there being a backhaul link between the second node and a first node of the IAB system, wherein the second node is a parent node of the first node in network topology of the IAB system, and there is an access link between the user equipment and the first node, wherein the electronic device comprises a processing circuitry configured to: acquire, with a reference signal transmitted between the second node and the user equipment, integrated channel state information of a downlink baseband integrated channel through the backhaul link, the first node, and the access link, wherein the first node operates in Amplify and Forward (AF) mode; and based on the acquired integrated channel state information, calculate a digital precoding matrix for downlink transmission of the user equipment.

According to one aspect of the present disclosure, there is provided an electronic device on side of user equipment, there being an access link between the user equipment and a first node of an integrated access and backhaul (IAB) system, there being a backhaul link between the first node and a second node of the IAB system, wherein the second node is a parent node of the first node in network topology of the IAB system, characterized in the electronic device comprising: a processing circuitry configured to receive a data stream transmitted through the backhaul link, the first node, and the access link, wherein the first node operates in Amplify and Forward (AF) mode, wherein the data stream is precoded by the second node using a digital precoding matrix, wherein the digital precoding matrix is calculated based on integrated channel state information of a downlink baseband integrated channel through the backhaul link, the first node, and the access link, and wherein the integrated channel state information is acquired through a reference signal transmitted between the second node and the user equipment.

According to one aspect of the present disclosure, there is provided an electronic device for a node in an integrated access and backhaul (IAB) system, the node being referred to as a first node, there being an access link between the first node and user equipment, there being a backhaul link between the first node and a second node of the IAB system, where the second node is a parent node of the first node in network topology of the IAB system, characterized in the electronic device comprising: a processing circuitry configured to forward a data stream from the second node to the user equipment in Amplify and Forward (AF) mode, wherein the data stream is precoded by the second node using a digital precoding matrix, wherein the digital precoding matrix is calculated based on integrated channel state information of a downlink baseband integrated channel through the backhaul link, the first node, and the access link, and wherein the integrated channel state information is acquired with a reference signal transmitted between the second node and the user equipment.

According to one aspect of the present disclosure, there is provided a communication method comprising operations performed by any of the above processing circuitries.

According to one aspect of the present disclosure, there is provided a non-transitory computer readable storage medium storing executable instructions which, when executed, carry out operations performed by any of the above processing circuitries.

DESCRIPTION OF THE DRAWINGS

A better understanding of the present disclosure may be achieved by referring to a detailed description given hereinafter in connection with accompanying drawings, wherein the same or similar reference signs are used to indicate the same or similar elements throughout the drawings. The drawings are included in the specification and form a part of the specification along with the following detailed descriptions, for further illustrating embodiments of the present disclosure and for explaining the theory and advantages of the present disclosure. Wherein.

Figure 1:
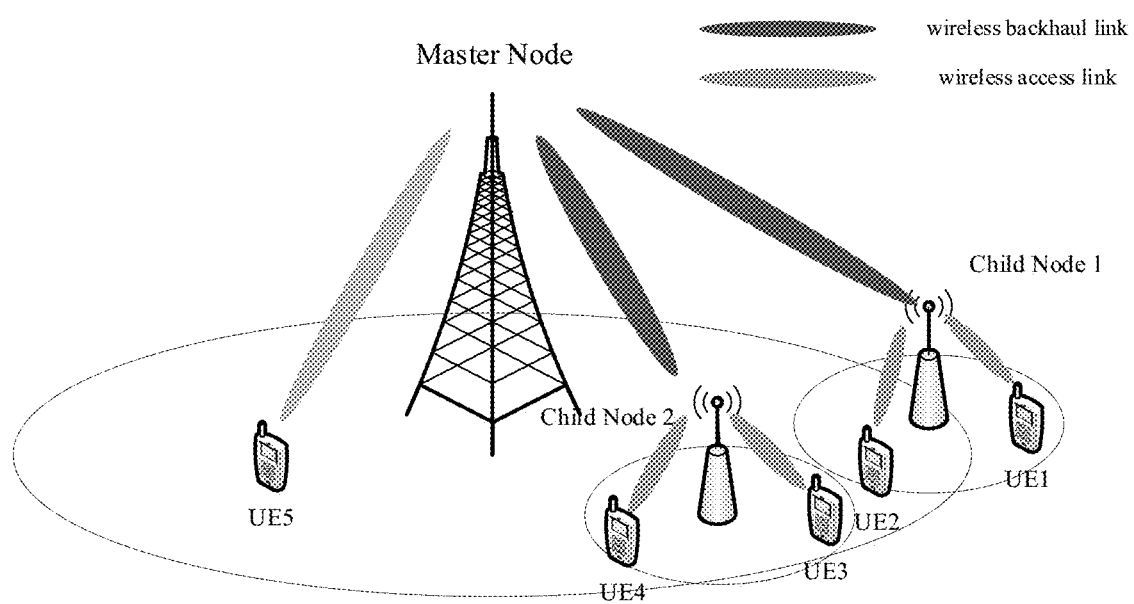
FIG. 1 shows a schematic diagram of the IAB system.

Further features of the present invention will become apparent from the following description of exemplary embodiments with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all features are described in the specification. Note that, however, many settings specific to the implementations can be made in practicing the embodiments of the present disclosure according to specific requirements, so as to achieve specific goals of the developers, for example, to comply with the limitations related to apparatus and service, and these limitations may vary from implementations. Furthermore, it will be appreciated that the developing work will be a routine task, despite complex and tedious, for those skilled in the art who benefit from the present disclosure.

In addition, it should be noted that the figures illustrate only steps of a process and/or components of a device that are closely related to the technical solutions according to the present disclosure, and omit other details that are in little relation to the invention. The following description of illustrative embodiments are merely explanatory and should not be regarded as any limitation to the scope of the present disclosure and the applications thereof.

For convenient explanation of the technical solutions of the present disclosure, various aspects of the present disclosure will be described below in the context of 5G NR. However, it should be noted that this is not a limitation on the scope of application of the present disclosure, and one or more aspects of the present disclosure can also be applied to wireless communication systems that have been commonly used, such as 4G LTE/LTE-A, or various wireless communication systems to be developed in future. The architecture, entities, functions, processes and the like as described in the following description are not limited to those in the NR communication system, but can be found in other communication standards.

IAB System Overview

The IAB system forms an access network with a series of IAB base stations (also called "nodes" herein) according to a certain network topology, where the so-called IAB base station refers to a base station that integrates wireless access and wireless backhaul functions. The IAB base station can be a 5G NR base station. According to the first 5G standard R15 released by 3GPP, NR base stations include gNBs and ng-eNBs, in which gNB is a newly defined node in R15 that provides NR user plane and control plane protocols terminating with a terminal device (also called "user equipment", sometimes simply called "UE"); ng-eNB is a node defined for compatibility with 4G LTE communication system, which can be an upgradation of evolved Node B (eNB) of the LTE radio access network, and provides E-UTRA (E-UTRA) user plane and control plane protocols terminating with UE.

It should be noted that the IAB base station is not limited to the above two kinds of base stations, but encompasses various control devices on the network side. For example, in addition to the gNB and ng-eNB provided in the 5G communication standard, depending on the scenario to which the technical solution of the present disclosure is applied, the IAB base station may also be, for example, an eNB in the LTE communication system, a remote radio head, a wireless access point, a drone control tower, a control node in automated factory or a communication device that performs similar functions. Application examples of the base station will be described in the following chapter in detail.

In addition, in the present disclosure, the term "UE" has the full breadth of its usual meaning, including various terminal devices or in-vehicle devices that communicate with a base station. For example, the UE may be a terminal device such as a mobile phone, a laptop, a tablet, an in-vehicle communication device, a drone, a sensor and an actuator in an automated factory or the like, or a component thereof. Application examples of the UE will be described in the following chapter in detail.

The nodes of the IAB system can be divided into two categories: one is IAB master node (IAB donor, simply called "Master Node" herein) that provides an interface to the core network, and there is a wired connection between the master node and the core network, such as an optical fiber; the other is IAB node (sometimes simply called "Child Node" herein) that does not provide an interface to the core network, and there is no wired connection between the IAB node and the core network.

FIG. 1 illustrates a schematic diagram of a single-hop IAB system. As shown in FIG. 1, there is a wireless backhaul link between the IAB master node and the IAB node (Child Node 1, Child Node 2), and there is an access link between the IAB node and its UE, so that the UE can connected to the IAB master node to access the core network (not shown in the figure) via the IAB node. There may also be an access link between the IAB master node and its access user (for example, UE5), which is called "direct access link" herein for the purpose of distinction.

The IAB node plays dual roles of a user and a base station in the IAB system. For example, as shown in FIG. 1, in the first tier, Child Node 1 and Child Node 2 can be regarded as special access users of Master Node, and Master Node provides service for Child Node 1, Child Node 2 and UE5 in its cell; in the second tier, Child Node 1 and Child Node 2 are base stations of UE1, UE2 and of UE3, UE4, respectively, and they respectively provide services for the accessing user equipment in their small cells.

The IAB node between the IAB master node and the UE can have two operating modes for the data transmitted through it: one is Amplify and Forward (AF) mode, the other is Decode and Forward (DF) mode. In the AF mode, the IAB node merely amplifies and forwards the received analog signal, and is often used to handle some coverage holes. The IAB node operating in the AF mode is transparent to the UE and the IAB master node, since it amplifies all received signals, including useful signals, noise and interference, which means that the signal-to-noise ratio at the output will not be higher than that at the input of the IAB node, and thus it is suitable for environments with a high signal-to-noise ratio. In the DF mode, the IAB node decodes and re-encodes the received signal before forwarding the received signal to its access user. The significance of this decoding and re-encoding process is that it will not amplify noise and interference, so it is especially suitable for environments with a low signal-to-noise ratio. However, the decoding and re-encoding process in the DF mode often means a large time delay.

Figure 2:
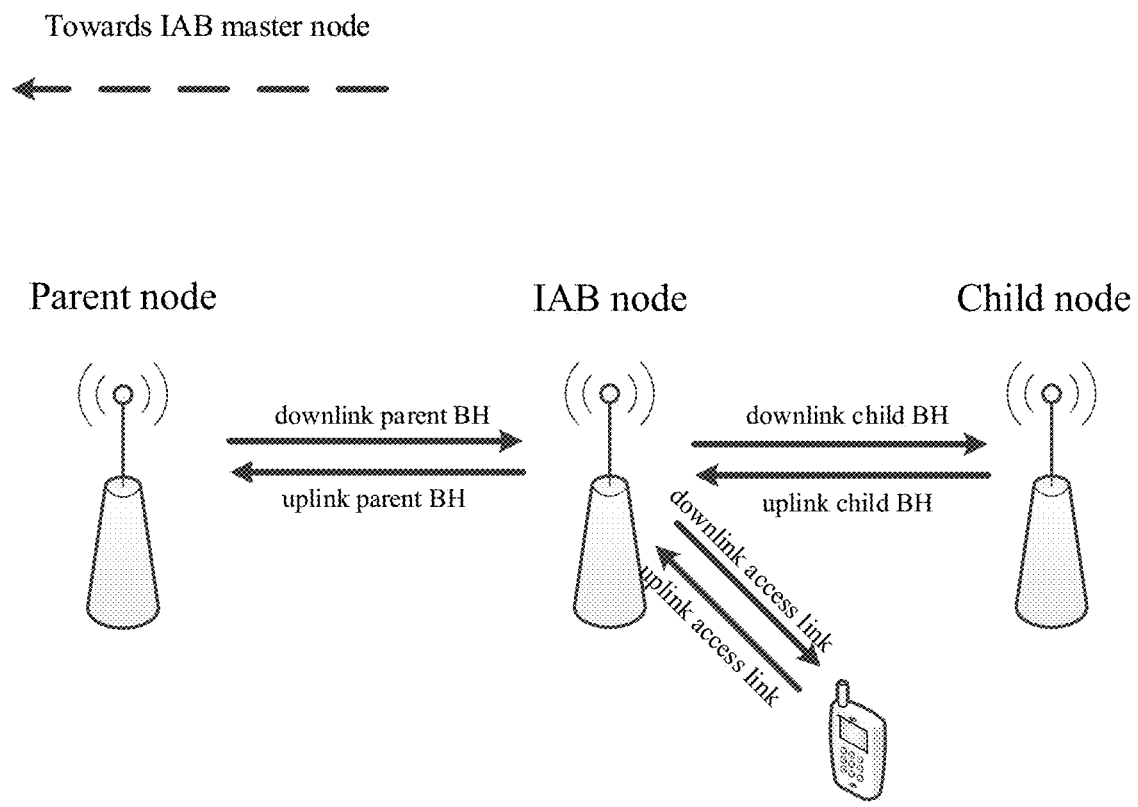
FIG. 2 shows a network topology of the IAB system.

It should be understood that the actual IAB system may have more than two tiers, that is, the link between the IAB master node and the UE passes through more than one IAB node. FIG. 2 generally illustrates a schematic diagram of network topology of a multi-hop IAB system. If an IAB node controls and schedules another IAB node, the IAB node is a parent node of the another IAB node. There are parent backhaul links (BH) between the IAB node and its parent node, including a downlink parent backhaul link and an uplink parent backhaul link. If an IAB node is under the control of another IAB node, the IAB node is a child node of the another IAB node. There are child backhaul links between the IAB node and its child node, including a downlink child backhaul link and an uplink child backhaul links. Obviously, the same IAB node may be both a parent node and a child node, but the IAB master node can only be a parent node. At the same time, the master node and each child node can both provide a wireless access link for their access UEs, including a downlink access link and an uplink access link.

It can be seen that the nodes of the IAB system perform data backhaul through wireless backhaul links without the need for a wired transmission network. Therefore, it is easier to deploy base stations in dense scenarios, reducing the cost of deploying wired transmission networks.

Figure 3A:
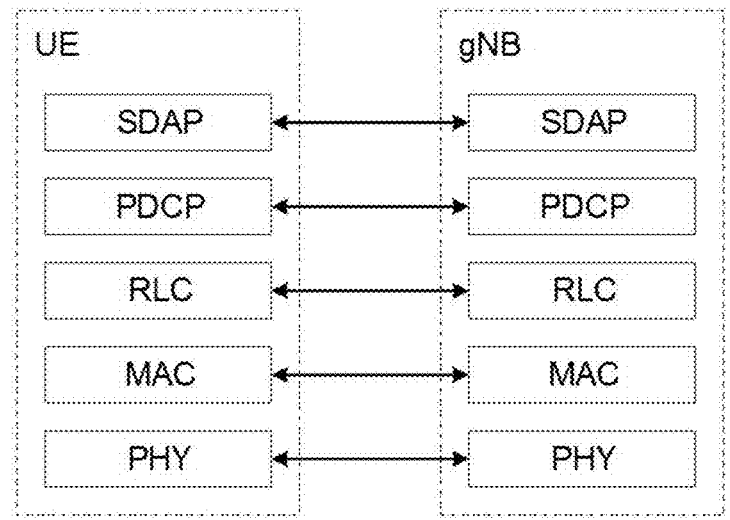
FIGS. 3A and 3B are NR radio protocol architectures of the user plane and control plane, respectively.
Figure 3B:
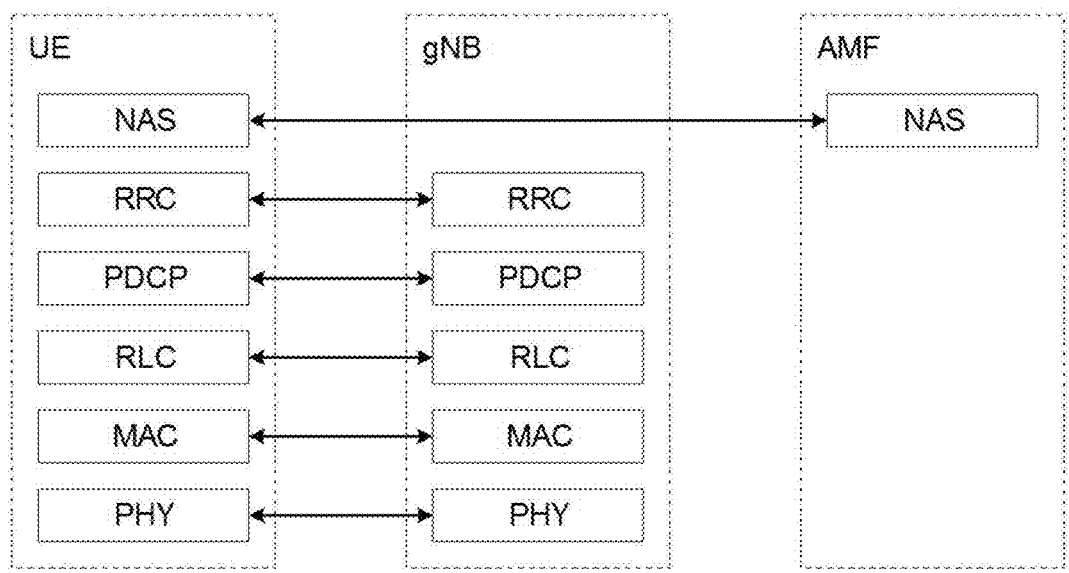

Radio protocol stack for the user plane and control plane of the IAB base station and UE in 5G NR is described below with reference to FIGS. 3A and 3B. The radio protocol stack may include Layer 1, Layer 2, and Layer 3.

Layer 1 (L1) is the lowest layer and implements various physical-layer signal processing to provide a transparent transmission function of signals. The L1 layer will be referred to herein as physical layer (PHY).

A brief introduction is provided of various signal processing functions of the L1 layer (i.e., the physical layer) implemented on the base station side, which include coding and interleaving to facilitate forward error correction (FEC) at the UE, and mapping to signal constellations based on various modulation schemes (for example, Binary Phase Shift Keying (BPSK), Quadrature Phase Shift Keying (QPSK), M-Phase Shift Keying (M-PSK), M-Quadrature Amplitude Modulation (M-QAM)). Subsequently, the coded and modulated symbols are split into parallel streams. Each stream is then used with a reference signal to generate a physical channel that carries a stream of time-domain symbols. The stream of symbols is spatially pre-coded to generate multiple spatial streams. Channel estimation can be used to determine coding and modulation schemes and for spatial processing. The channel estimation may be derived from the reference signal transmitted by the UE and/or channel condition feedback. Each spatial stream is then provided to a different antenna via a separate transmitter. Each transmitter modulates the RF carrier with its own spatial stream for transmission.

At the UE, each receiver receives the signal with its respective antenna. Each receiver recovers the information modulated on the radio frequency (RF) carrier and provides this information to various signal processing functions of the L1 layer. Spatial processing is performed on the information at the L1 layer to recover any spatial stream destined for the UE. If there are multiple spatial streams destined for the UE, they can be combined into a single symbol stream. This symbol stream is then converted from the time domain to the frequency domain. By determining the signal constellation points which are the most likely to be transmitted by the base station, each of the symbols and the reference signal are recovered and demodulated. These soft decisions can be based on the channel estimation. These soft decisions are then decoded and de-interleaved to recover the data and control signals originally transmitted by the base station on the physical channel. These data and control signals are then provided to higher-level processing.

Layer 2 (L2 layer) is above the physical layer. In the user plane, the L2 layer includes a medium access control (MAC) sublayer, a radio link control (RLC) sublayer, a packet data convergence protocol (PDCP) sublayer, and a service data adaptation protocol (SDAP) sublayer. In addition, in the control plane, the L2 layer includes a MAC sublayer, an RLC sublayer, and a PDCP sublayer. These sublayers have the following relationships: the physical layer provides transmission channels for the MAC sublayer, the MAC sublayer provides logical channels for the RLC sublayer, the RLC sublayer provides RLC channels for the PDCP sublayer, and the PDCP sublayer provides radio bearers for the SDAP sublayer.

In the control plane, a radio resource control (RRC) sublayer in Layer 3 (L3 layer) is also included in the UE and the base station. The RRC sublayer is responsible for obtaining radio resources (i.e., radio bearers) and for configuring the lower layers using RRC layer signaling between the base station and the UE. In addition, the non-access stratum (NAS) control protocol in the UE performs functions such as authentication, mobility management, and security control.

Both of the base station and the UE have many antennas to support the massive MIMO technology. For the antenna model, a three-level mapping relationship is generally defined around the antennas, so that it can successfully undertake the channel model and the communication standard.

The bottom level is the basic physical units antennas, which can also be called antenna elements. Each of the antenna elements radiates electromagnetic waves according to its own amplitude parameter and phase parameter.

The antenna elements are arranged into one or more antenna arrays in form of matrix. An antenna array can be composed of an entire row, an entire column, multiple rows, and multiple columns of antenna elements. In this level, each antenna array actually constitutes a Transceiver Unit (TXRU). Each TXRU is independently configurable. By configuring the amplitude parameters and/or phase parameters for the antenna elements that make up a TXRU, the antenna pattern of the TXRU is adjusted, so that the electromagnetic wave radiations emitted by all the antenna elements in the antenna array form a narrow beam pointing to a specific spatial direction, that is, beamforming is implemented.

Finally, one or more TXRUs form antenna port(s) seen at the system level by logical mapping. "Antenna port" is defined such that a channel over which a symbol on a certain antenna port is carried can be inferred from a channel over which another symbol on the same antenna port is carried. For example, for demodulation reference signal (DMRS) associated with physical downlink shared channel (PDSCH), only when both the PDSCH symbol and the DMRS symbol are in the same transmission resource scheduled for the PDSCH, that is, in the same time slot and the same resource block group (PRG), the channel carrying the PDSCH symbol on one antenna port can be inferred from the channel carrying the DMRS symbol on the same antenna port. This means that different signals transmitted by the same antenna port experience the same channel environment.

The DMRS reference signal is a UE-specific reference signal, that is, the DMRS signal of each UE is different, and is used to evaluate the wireless channel to facilitate signal demodulation. For the same UE, in order to support a multi-layer MIMO transmission (i.e., multiple spatial streams), multiple orthogonal DMRS ports need to be scheduled, where each DMRS port corresponds to each layer of MIMO. "Orthogonality" can be achieved through frequency division multiplexing (FDM), time division multiplexing (TDM) and code division multiplexing (CDM) with a comb structure.

The process of transmitting data by the base station or the UE using the antenna array is briefly described below. First, baseband signals representing a user data stream are mapped onto m (m≥1) radio frequency links by digital precoding. Each of the radio frequency links up-converts the baseband signal to obtain a radio frequency signal, and transmits the radio frequency signal to the antenna array of the corresponding antenna port. The antenna array performs beamforming on the radio frequency signal by adjusting the amplitude and phase thereof, so as to form a narrow beam aligned with the transmission direction, and this process may also be referred to as "analog precoding". An opposite process is performed by the antenna array to receive a beam.

In addition, more flexible digital beamforming can be achieved by performing digital precoding operations at the antenna port level, such as precoding for a single user or multiple users to achieve multi-stream or multi-user transmission.

The use of MIMO technology enables the base station and the UE to use the space domain to support spatial multiplexing, beamforming, and transmit diversity. The nodes in the IAB system support downlink and uplink multi-user MIMO transmissions for their access users, for example, spatial multiplexing of downlink transmissions to UEs and child nodes, and spatial multiplexing of uplink transmissions from UEs and child nodes. The node that provides multi-user MIMO services simultaneously transmit different data streams on the same time-frequency resources, and these data streams are sent to multiple UEs to increase the total system capacity.

Figure 4:
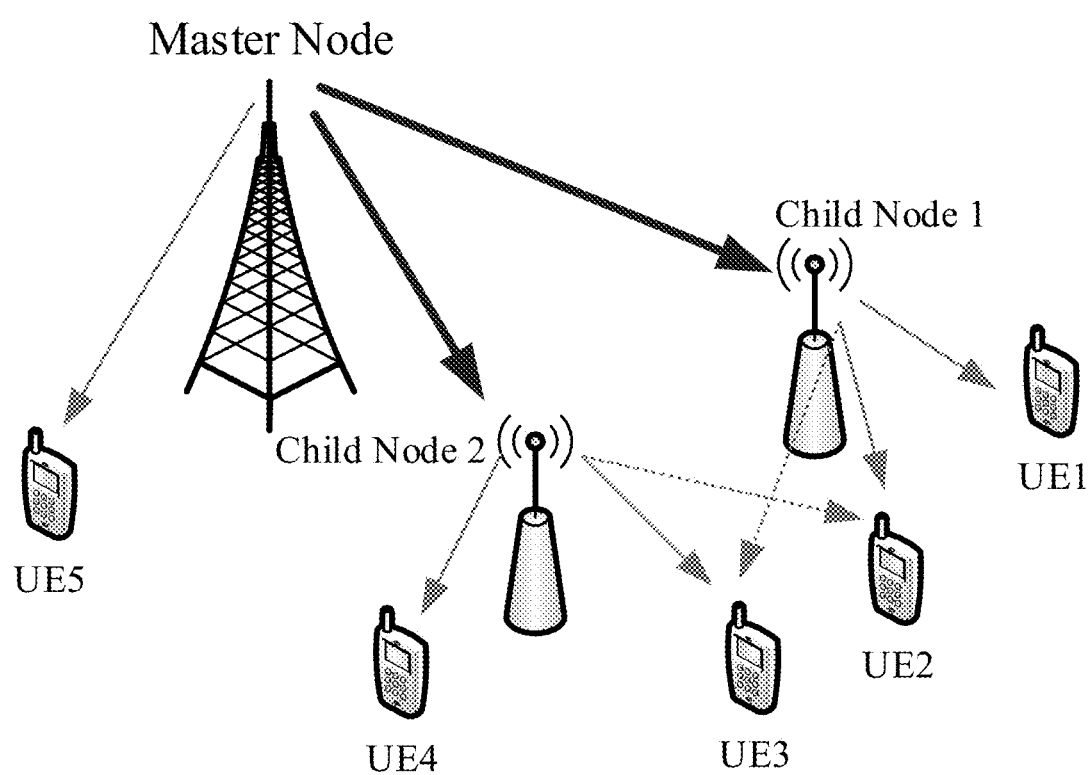
FIG. 4 shows a simplified schematic diagram of the IAB system.

However, since the child node can be regarded as both a base station and a user in the IAB system, the multi-user MIMO of the IAB system has a more complicated topology when compared with the traditional cellular system. FIG. 4 is a simplified schematic diagram of the single-hop two-tier IAB system shown in FIG. 1, in which only the downlink is shown. As shown in FIG. 4, for the first tier, both Child Node 1 and Child Node 2 can be regarded as special access users. Master Node provides a multi-user MIMO service for Child Node 1, Child Node 2 and UE5 in its cell by using the same time-frequency resources; for the second tier, both Child Node 1 and Child Node 2 can be regarded as base stations, and provide multi-user MIMO services to access users in their small cells by using the same time-frequency resources, for example, Child Node 1 serves UE1 and UE2, and Child Node 2 serves UE3 and UE4.

In order to avoid inter-tier interference, in the IAB system, the node and its child nodes adopt an operating mode of frequency-division multiplexing. In the exemplary IAB system shown in FIG. 4, the backhaul link in the first tier and the access link in the second tier operate in different frequency bands. At the same time, with respect to the access link and the backhaul link, a duplex mode of time-division duplex (TDD) in both of the downlink and the uplink is adopted to reduce downlink channel estimation overhead by means of channel reciprocity.

However, although the frequency-division multiplexing is used in different layers of the IAB system to avoid the inter-tier interference, links in the same tier may operate in the same frequency band. For example, in the example shown in FIG. 4, Child Node 1 and Child Node 2 may use the same or close time-frequency resources. At this time, if Child Node 1 provides a multi-user MIMO transmission for UE1 and UE2, and Child Node 2 provides a multi-user MIMO transmission for UE3 and UE4, interference may occur between the two adjacent small cells. For example, if UE2 and UE3 are located closely, UE2 may suffer from signal interference due to downlink transmission from Child Node 2 to UE3. Similarly, UE3 may also suffer from signal interference due to downlink transmission from Child Node 1 to UE2.

The present disclosure provides an improved solution for multi-user MIMO transmission aimed at reducing or eliminating such inter-small-cell interference.

The First Embodiment

The first embodiment will be described below with reference to figures.

According to the first embodiment of the present disclosure, the access link used by the interfered UE is switched into another tier of the IAB system to avoid signal interference from adjacent small cells in the same tier. Hereinafter, the single-hop two-tier IAB system shown in FIG. 4 will be used as an illustrative scenario, in which UE2 is interfered by the same-frequency signal from Child Node 2. However, it should be noted that the scenario targeted by the present embodiment is not limited thereto. For example, the IAB system may not be limited to two tiers, but may have more than two tiers, and the node that generates the same-frequency interference may not be limited to a child node under the same master node.

Figure 5:
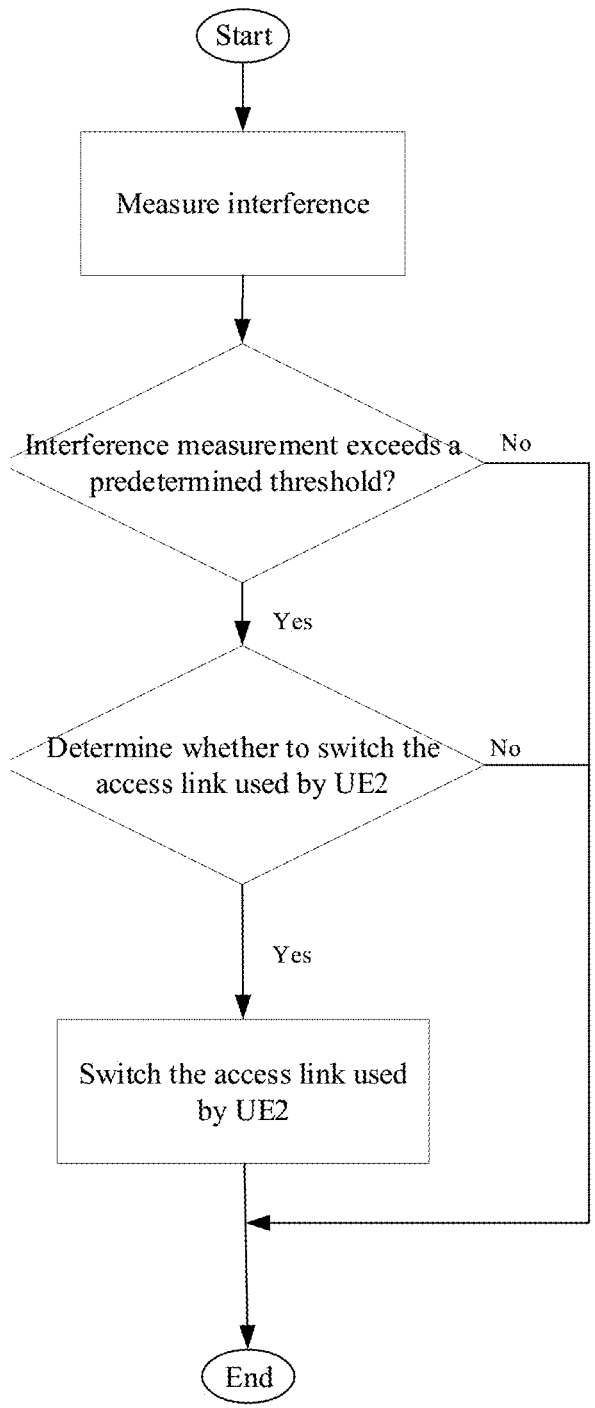
FIG. 5 shows an exemplary flow chart of inter-tier link switching according to the first embodiment of the present disclosure.

FIG. 5 is a simplified flowchart showing an inter-tier switching process according to the first embodiment of the present disclosure.

First, the interfered user equipment UE2 performs interference measurement in order to learn a degree of interference. Preferably, UE2 can accurately measure the interference by measuring a reference signal.

For example, the reference signal may be channel state information reference signal (CSI-RS) used for channel evaluation. The interfering Child Node 2 transmits a non-zero power CSI-RS (NZP-CSI-RS), and the NZP-CSI-RS resource may be coordinated and allocated to Child Node 2 by Master Node. In order to facilitate UE2 to receive the NZP-CSI-RS, Child Node 2 may transmit the reference signal by using the transmitting beam that was ever used for downlink transmission to the UE3.

UE2 uses the antenna array to receive the NZP-CSI-RS from Child Node 2 and performs the signal measurement. For example, UE2 may measure reference signal received power (RSRP) as the interference measurement.

During the measurement, in order to avoid the influence of downlink transmission from Child Node 1, Master Node may also allocate a zero-power CSI-RS (ZP-CSI-RS) to Child Node 1. Of course, Child Node 1 transmitting ZP-CSI-RS is equivalent to transmitting no signal. Therefore, the signal received by UE2 is the interference from Child Node 2.

Then, UE2 reports the obtained interference measurement to corresponding Child Node 1. The UE2 may quantize the interference measurement (for example, RSRP) into a predetermined number of bits (for example, 7 bits), and send the quantized interference measurement to Child Node 1 along with a CSI-RS resource indicator (CRI).

The interference measurements can be used to evaluate a severity of the interference. In a preferred example, the interference measurement from UE2 can be compared with a predetermined threshold. In the case where the interference measurement is RSRP, the predetermined threshold may be a pre-defined RSRP.

The comparison process between the interference measurement and the predetermined threshold may take place at Child Node 1. In this example, Child Node 1 compares the received interference measurement with the predetermined threshold. If the interference measurement exceeds the predetermined threshold in the comparison, it means that the signal interference on the access link currently used by UE2 is severe. Child Node 1 notifies Master Node of the comparison result. For example, Child Node 1 can send a link switch attempt request to Master Node via the backhaul link for attempting to switch the access link used by the UE2, or Child Node 1 can send information about the relationship of magnitude between the interference measurement and the predetermined threshold to Master Node via the backhaul link. On the contrary, if the interference measurement does not exceed the predetermined threshold, it means that the signal interference on the access link currently used by the UE does not reach the degree of affecting the communication performance, and thus there is no need to switch the link.

Alternatively, the comparison process between the interference measurement and the predetermined threshold may take place at Master Node. In this example, Child Node 1 forwards the received interference measurement to Master Node via the backhaul link. After receiving the interference measurement, Master Node compares the interference measurement with the predetermined threshold. If the interference measurement exceeds the predetermined threshold in the comparison, it means that the signal interference on the access link currently used by UE2 is severe. On the contrary, if the interference measurement does not exceed the predetermined threshold, it means that the signal interference on the access link currently used by the UE is not severe, and there is no need to switch the link.

Next, Master Node makes a determination on whether it is necessary to switch the access link used by UE2. This determination process is based at least in part on the degree of interference on UE2.

As the simplest determination process, if the result of the above comparison is that the interference measurement exceeds the predetermined threshold, Master Node makes a determination that the access link used by UE2 is to be switched. Such determination processing mainly focuses on the interference problem of UE2.

Alternatively, Master Node may also consider other factors in determining whether to switch the access link used by UE2.

In an example of the determination process as described below, Master Node also considers an influence of the link switching on link quality.

Figure 6:
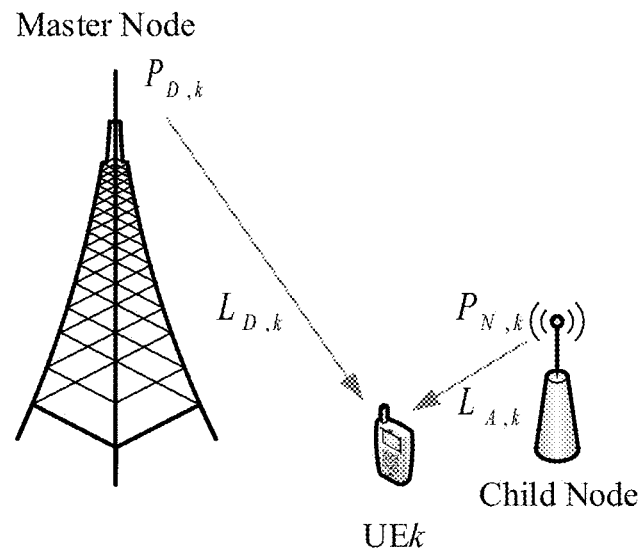
FIG. 6 shows cases of UE's access link before and after the switching.
Figure 6:
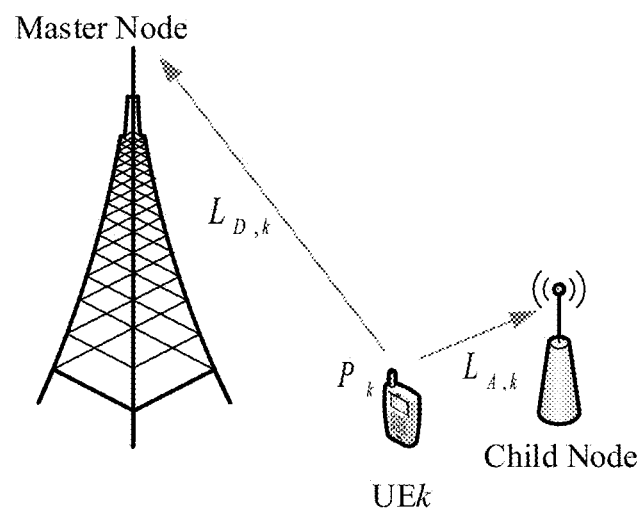

FIG. 6 illustrates cases before and after the switching of the access link for a generic UEk, in which FIG. 6(a) is about the downlink access link, and FIG. 6(b) is about the uplink access link.

Referring to FIG. 6(a), the downlink quality $R_{D,k}^{DL}$ of the direct access link between Master Node and UEk can be expressed as:

$$R_{D,k}^{DL}=P_{D,k}+G_{D,k}^{Tx}+G_{k}^{Rx}-L_{D,k}$$

Among them, $R_{D,k}^{DL}$ can be characterized by e.g. RSRP, $P_{D,k}$ represents a transmission power of Master Node, $G_{D,k}^{Tx}$ represents a transmission beamforming gain at Master Node, $G_{k}^{Rx}$ represents a reception beamforming gain at UEk, and $L_{D,k}$ represents a path attenuation of the direct access link.

Similarly, the downlink quality $R_{A,k}^{DL}$ of the access link between Child Node 1 and UEk can be expressed as:

$$R_{A,k}^{DL}=P_{A,k}+G_{A,k}^{Tx}+G_{k}^{Rx}-L_{A,k}$$

Among them, $R_{A,k}^{DL}$ can be characterized by e.g. RSRP, $P_{A,k}$ represents a transmission power of the child node, $G_{A,k}^{Tx}$ represents a transmission beamforming gain at the child node, $G_{k}^{Rx}$ represents a reception beamforming gain at UEk, and $L_{A,k}$ represents a path attenuation of the access link.

Generally, the transmission power of Master Node is greater than the transmission power of the child node, so $P_{D,k}>P_{A,k}$; and the link that directly accesses Master Node attenuates more than the link that accesses the child node, therefore, $L_{D,k}>L_{A,k}$; assuming that each of antenna ports of Master Node and the child node is configured with the same number of antennas, the transmission beamforming gain can be assumed to be $G_{D,k}^{Tx}=G_{A,k}^{Tx}$. Therefore, if $P_{D,k}-L_{D,k}>P_{A,k}-L_{A,k}$, for UEk, $R_{D,k}^{DL}>R_{A,k}^{DL}$ is possible, that is, accessing master node may get a higher downlink received power than accessing the child node, thereby achieving better downlink data service performance. On the contrary, if the access link quality after the switching deteriorates, the link switching may get more kicks than halfpence. To this end, Master Node can collect information about a change in link quality from the UE.

Similarly, the link quality change of the uplink access link will be discussed with reference to FIG. 6(b).

Referring to FIG. 6(b), the uplink quality $R_{A,k}^{UL}$ of the direct access link between Master Node and UEk can be expressed as:

$$R_{D,k}^{UL}=P_{k}+G_{k}^{Tx}+G_{D,k}^{Rx}-L_{D,k}$$

Among them, $R_{D,k}^{UL}$ can be characterized by e.g. RSRP, $P_k$ represents a transmission power of UEk, $G_k^{Tx}$ represents a transmission beamforming gain at UEk, $G_{D,k}^{Rx}$ represents a reception beamforming gain at Master Node, $L_{D,k}$ represents a path attenuation of the direct access link.

Similarly, the downlink quality $R_{A,k}^{UL}$ of the access link between Child Node 1 and UEk can be expressed as $$R_{A,k}^{UL}=P_{k}+G_{k}^{Tx}+G_{A,k}^{Rx}-L_{A,k}$$

Among them, $R_{A,k}^{UL}$ can be characterized by e.g. RSRP, $P_k$ represents a transmission power of UEk, $G_k^{Tx}$ represents a transmission beamforming gain at UEk, $G_{A,k}^{Rx}$ represents a reception beamforming gain at the child node, and $L_{A,k}$ represents a path attenuation of the access link.

Assuming that each of antenna ports of the master node and the child node is configured with the same number of antennas, then the reception beamforming gain is the same, that is, $G_{D,k}^{Rx}=G_{A,k}^{Rx}$, and since the direct access link has a larger path attenuation $L_{D,k}$, generally $R_{D,k}^{UL}<R_{A,k}^{UL}$, that is, the UE can generally achieve better transmission performance by accessing the child node for uplink data transmission.

With the above discussion, the switching between the link through which the UE accesses the master node and the link through which the UE accesses the child node may cause different link quality changes in the uplink direction and the downlink direction. In view of this change, a dual-connectivity architecture in which the uplink transmission and the downlink transmission of the UE are separated may be useful, that is, the nodes accessed by the uplink and by the downlink of the UE may be different.

A detailed example of the determination process of the master node considering the change in link quality is described below.

First, Master Node or Child Node 1 may instruct UE2 to initially access Master Node through cell search, to try to establish a direct access link between Master Node and UE2. Next, Master Node and UE2 can determine the optimal transmitting beam and the optimal receiving beam used on the direct access link through beam training.

Figure 7:
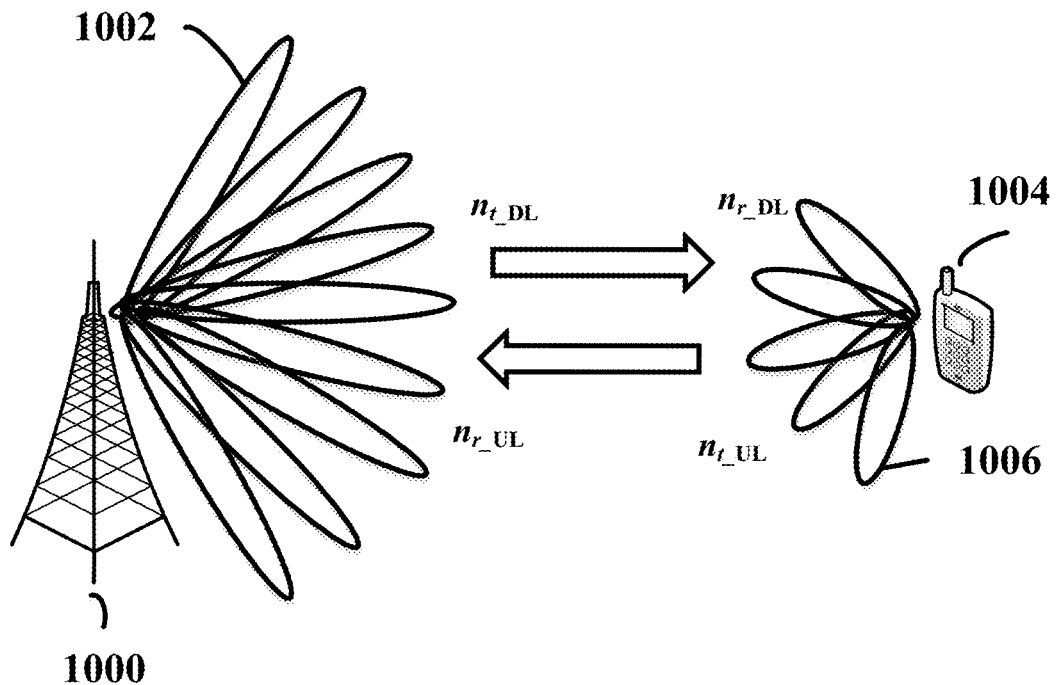
FIG. 7 shows a schematic diagram of beam scanning.

The beam training process between the base station and the UE will be briefly described below with reference to FIG. 7. As shown in FIG. 7, the base station 1000 may use $n_{t\_DL}$ ($n_{t\_DL} \geq 1$) downlink transmitting beams with different directions, and the UE 1004 may use $n_{r\_DL}$ ($n_{r\_DL} \geq 1$) downlink receiving beams with different directions. The base station 1000 and the UE 1004 traverse all transmitting beam-receiving beam combinations by means of beam scanning, so as to select the optimal transmitting beam-receiving beam pair.

The beam training process between the base station and the UE will be briefly described below with reference to FIG. 7. As shown in FIG. 6, the base station 1000 may use $n_{t\_DL}$ ($n_{t\_DL} \geq 1$) downlink transmitting beams with different directions, and the UE 1004 may use $n_{r\_DL}$ ($n_{r\_DL} \geq 1$) downlink receiving beams with different directions. The base station 1000 and the UE 1004 traverse all transmitting beam-receiving beam combinations by means of beam scanning, so as to select the optimal transmitting beam-receiving beam pair.

In the downlink beam scanning, first, the base station 1000 transmits $n_{r\_DL}$ downlink reference signals to the UE 1004 by each of its $n_{t\_DL}$ transmitting beams per downlink scanning period, whereby the base station 1000 sequentially transmit $n_{t\_DL} \times n_{r\_DL}$ downlink reference signals to the UE 1004. Reference signal resources that can be utilized by the base station 1000 include, for example, NZP-CSI-RS resources as well as synchronization signal and physical broadcast channel block (SSB) resources.

The UE 1004 receives each of the transmitting beams with its $n_{r\_DL}$ receiving beams 1006, and measures the beam signal. Then, the $n_{r\_DL}$ receiving beams of the UE 1004 receive and measure $n_{t\_DL} \times n_{r\_DL}$ downlink reference signals from the base station 1000 in total. For example, the UE 1004 may measure reference signal received power (RSRP), reference signal received quality (RSRQ), signal to interference plus noise ratio (SINR) or the like. Then, the UE 1004 reports the beam information to the base station 1000 in a form of beam report. Based on the reported beam information, the base station 1000 may select the optimal transmitting beam from the transmitting beams reported by the UE 1004 for purpose of downlink transmission with the UE 1004. In order to facilitate beam reception by the UE 1004, the base station 1000 indicates the selected optimal transmitting beam to the UE 1004. For example, the base station 1000 may indicate the reference signal corresponding to the optimal transmitting beam to the UE 1004, so that the UE 1004 can determine the receiving beam which corresponds to the reference signal in the beam scanning process as the optimal receiving beam.

The uplink scanning process is similar to the downlink scanning process, the base station 1000 selects the optimal receiving beam from its $n_{r\_UL}$ ($n_{r\_UL} \geq 1$) uplink receiving beams, and the UE 1004 selects the optimal transmitting beam from its $n_{t\_UL}$ ($n_{t\_UL} \geq 1$) uplink transmitting beams. Redundant description thereof is omitted.

Through the above scanning training, Master Node and UE2 can select the beams most suitable for the wireless channel. In particular, in the beam training process, in addition to measuring the beam information, the UE2 also measures the optimal downlink quality $R_{D,2}^{DL}$ during the beam training. This optimal downlink quality can represent, to some extent, a downlink quality of the direct access link to be established between Master Node and UE2. In addition, UE2 can also measure the downlink quality $R_{A,2}^{DL}$ of the existing access link between it and Child Node 1. UE2 can calculate the gain of downlink quality caused by the link switching:

$$\Delta_{R,2}^{DL} = R_{D,2}^{DL} - R_{A,2}^{DL},$$

It should be understood that the so-called "gain" $\Delta_{R,2}^{DL}$ is not necessarily a positive value, and may be a negative value in some cases, which means that the link switching will cause the link quality of the downlink access link to deteriorate.

UE2 reports the information about the gain $\Delta_{R,2}^{DL}$ of downlink quality to Master Node for reference when Master Node determines whether to switch the access link used by the UE2.

In one example, Master Node performs a comparison whether the downlink quality gain $\Delta_{R,2}^{DL}$ is greater than a certain threshold (it can be a negative value, zero or a positive value) or not, if yes, it means that the link switching will not leads to intolerable link quality deterioration, and Master Node makes a determination that the access link used by UE2 is to be switched. If no, it means that the influence of link switching on the link quality cannot be ignored, and Master Node will not make a determination to switch the access link used by UE2.

In another example, considering that the downlink transmissions of UE2 and UE3 may interfere with each other, switching the access link of UE3 can also achieve an effect of eliminating the interference between users. Thus, similar to UE2, Master Node can perform beam training for UE3, and UE3 can measure the optimal downlink quality $R_{D,3}^{DL}$ of the direct access link between UE3 and Master Node during the beam training, measure the downlink quality RJ of the existing access link between it and Child Node 1, and calculate the gain of downlink quality due to the link switching:

$$\Delta_{R,3}^{DL} = R_{D,3}^{DL} - R_{A,3}^{DL}.$$

UE3 reports the information about UE3's downlink quality gain $\Delta_{R,3}^{DL}$ to Master Node, so Master Node can determine which UE is better for link switching based on the following criteria:

$$k = \mathrm{argmax}\, \Delta_{R,k}^{DL}, k=2\text{ or }3.$$

When the gain of UE2's downlink quality exceeds the gain of UE3's downlink quality, the following link switching process will be performed for UE2. Otherwise, the following link switching process is performed for UE3.

Returning to FIG. 5, in a case where Master Node determines to switch the access link used by UE2, Master Node establishes a direct access link between Master Node and UE2, and instructs Child Node 1 to disconnect the access link between Child Node 1 and UE2. As a result, the access link used by UE2 is switched from the second tier to the first tier.

In an example, the above-mentioned link switching may refer to a switching of both of the downlink and the uplink in the access link, that is, the downlink access link and the uplink access link between Master Node and UE2 are established, and the downlink access link and the uplink access link between Child Node 1 and UE2 are disconnected.

In another example, the above-mentioned link switching may refer to a switching of only the downlink access link. Specifically, according to the device capability information reported by the user equipment, the IAB system according to the present disclosure can support a dual-connection architecture with separate uplink and downlink transmission. After the link switching, UE2 receives downlink data from Master Node and sends uplink data to Child Node 1. Since the frequency-division multiplexing is adopted between Master Node and the child nodes, the downlink access link between UE2 and Master Node and the uplink access link between UE2 and Child Node 1 operate in different frequency bands, that is, different bandwidth parts (BWP).

In a further example, the above-mentioned link switching may refer to a switching of only the downlink data link. Specifically, in response to Master Node determining to switch the access link used by UE2, the downlink data link between Master Node and UE2 is established, and the downlink data link between Child Node 1 and UE2 is disconnected, but the uplink (including uplink data link and uplink control link) and the downlink control link between Child Node 1 and UE2 are maintained. This achieves an advantage that Child Node 1 can maintain the necessary downlink control signaling for the switched UE2 to facilitate fast access link recovery.

Figure 8:
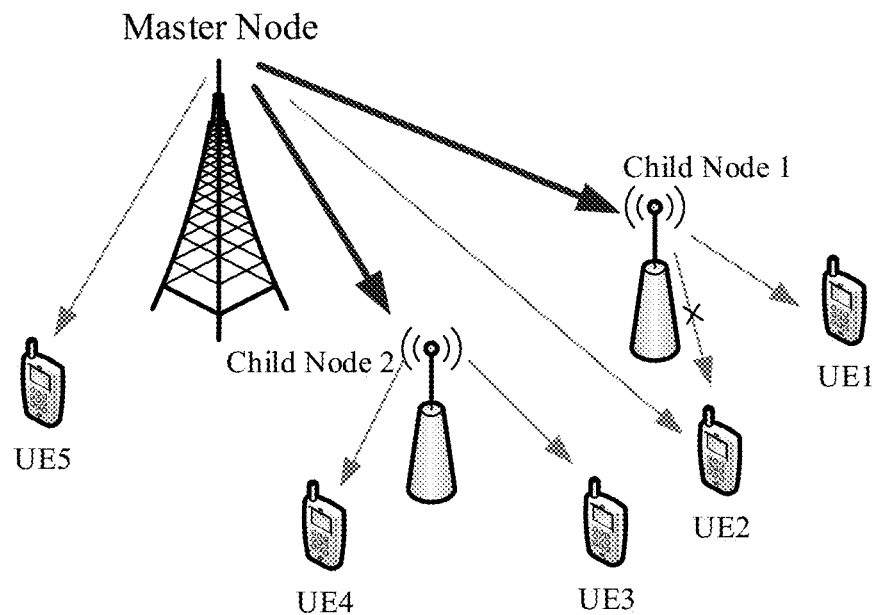
FIG. 8 shows a change of links of the IAB system in FIG. 4 before and after switching.

As shown in FIG. 8, after the link switching, the access link (at least the downlink access link) of UE2 is changed to access Master Node instead of Child Node 1, that is, from the second tier to the first tier. Due to the characteristics of frequency-division multiplexing adopted by different tiers of the IAB system, the downlink transmission between UE2 and Master Node and the downlink transmission between UE3 and Child Node 2 will not interfere with each other, which improves the communication performance of the system.

Although the inter-tier switching process of a single-hop two-tier IAB system is mainly described above with reference to FIG. 4, it should be noted that the first embodiment of the present disclosure is also applicable to a multi-hop IAB system. Preferably, for an IAB system with N (N>2) tiers, the access link of the UE to be switch can be switched from the N-th tier to the (N−1)-th tier, that is, the UE accesses the parent node of its access node instead. Alternatively, the UE to be switched can also be switched to the (N−2)-th tier, the (N−3)-th tier or the like, as long as the access link after the switching can meet the communication requirements of the UE.

In the first embodiment of the present disclosure, a problem that needs to be noticed is that Master Node needs to assign a new DMRS port for the access link of UE2. The NR base station can support a limited number of downlink DMRS ports for MIMO transmission. For example, based on downlink operating mode 1 (TM1) of NR, up to 12 downlink DMRS ports are supported for multi-user MIMO, and up to 8 downlink DMRS ports are supported for single-user MIMO.

In the exemplary IAB system shown in FIG. 4, Child Node 1 operates in the DF mode, and the data of UE1 and UE2 sent by Master Node to Child Node 1 via the backhaul link is demodulated at Child Node 1, and then is recoded and forwarded to UE1 and UE2, respectively. Assuming that UE1 and UE2 both have only one data stream, the method for sending the data streams from Master Node to Child Node 1 may include: 1) mixing into one data stream for transmission according to a certain rule; and 2) dividing into two independent data streams for transmission. Method 1) requires Master Node to configure only one DMRS port for the backhaul link of Child Node 1, but the data rate for each UE is low and the delay is great; Method 2) requires Master Node to configure two DMRS ports for the backhaul link of Child Node 1, but the data rate for each UE is high and the delay is low. Therefore, when the child node is operating in the DF mode, Master Node is allowed to flexibly configure the transmission method and the DMRS port of the backhaul link according to the DMRS port configuration and data rate requirements of the access link of each of its child nodes.

Generally, the j-th child node in the second tier is assigned with $K_{A,N_j}^{DMRS} \leq 12$ downlink DMRS ports for its access link. Based on the data rate requirement of its access user, the child node can report, to Master Node through uplink control information (UCI), the number of DMRS ports $K_{B,N_j}^{DMRS}$ that it recommends to configure for the backhaul link, where $K_{B,N_j}^{DMRS} \leq K_{A,N_j}^{DMRS}$. Based on this recommendation, Master Node can configure the number of DMRS ports for the backhaul link of the child node to be $K_{D,j}^{DMRS}$, which satisfies $K_{D,j}^{DMRS} \leq K_{B,N_j}^{DMRS}$ and informs the j-th child node through downlink control information (DCI).

In the first tier, the number $K_{UE}^{DMRS}$ of DMRS ports assigned by Master Node to the direct access link of the access UE such as UE2 should satisfy:

$$K_{UE}^{DMRS} \leq 12 - \Sigma_j K_{D,j}^{DMRS}.$$

Therefore, when the master node determines whether to perform inter-tier switching on the access link of the user to be switched (for example, UE2) according to the first embodiment of the present disclosure, the master node should also check whether there are enough DMRS ports for direct assignment to the user to be switched. If the number of DMRS ports is insufficient, the master node can re-assign the DMRS ports of the direct access link of the UE and of the backhaul link of the child node as needed, and adjust the transmission mode for downlink data on the backhaul link and inform the corresponding UE and child nodes through DCI.

A signaling flowchart of the inter-tier link switching process according to the first embodiment will be described below with reference to FIG. 9 and FIG. 10.

Figure 9:
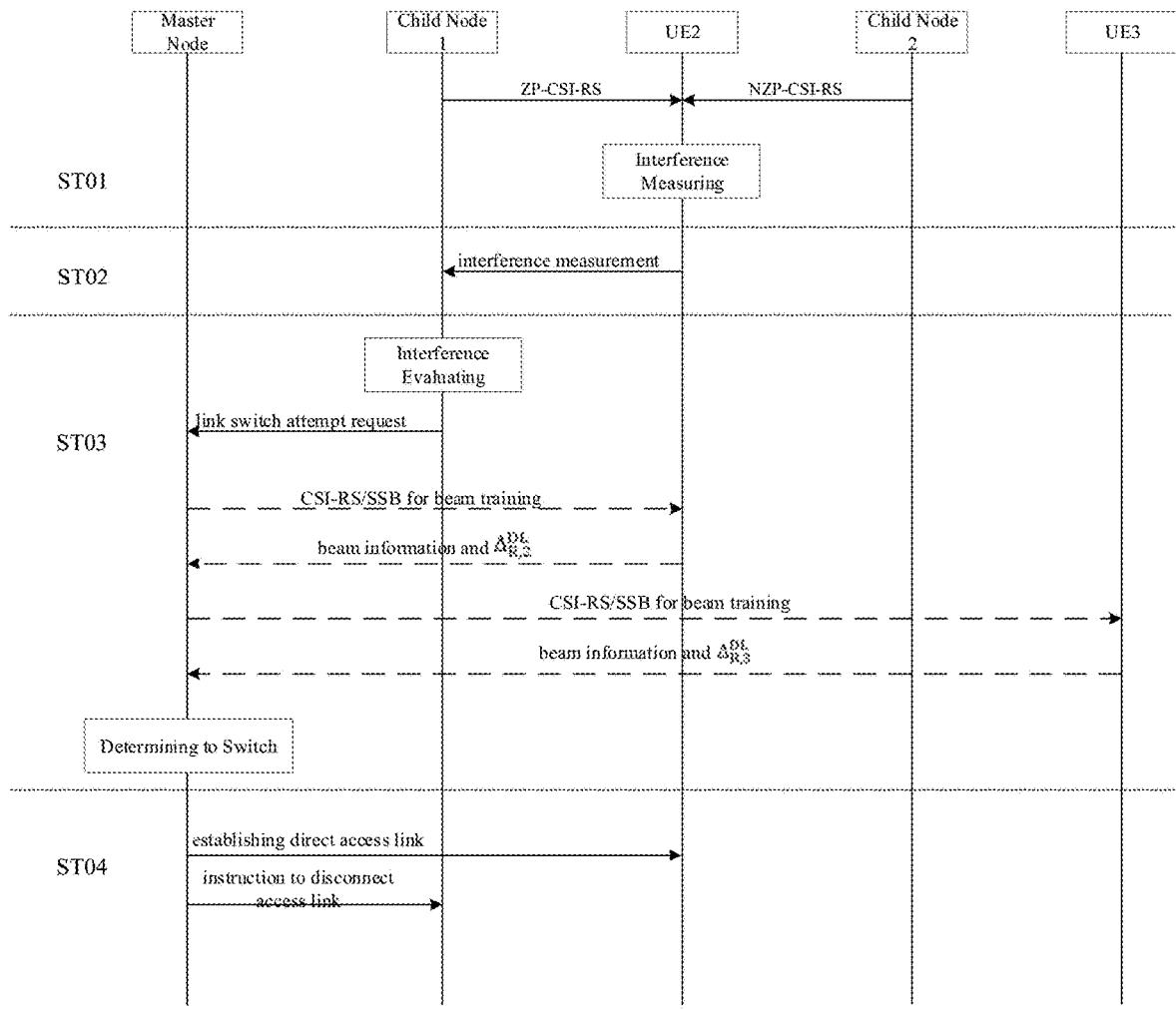
FIGS. 9 and 10 show examples of signaling flow of the inter-tier link switching according to the first embodiment of the present disclosure.

FIG. 9 illustrates a signaling flow chart of an example of inter-tier link switching according to the first embodiment. First, in stage ST01, UE2 performs interference measuring. For example, it measures RSRP of NZP-CSI-RS transmitted by Child Node 2 of the adjacent small cell. At this time, Child Node 1 transmits ZP-CSI-RS to exclude an influence of Child Node 1 on the interference measurement.

In stage ST02, UE2 reports the measured interference measurement (for example, RSRP) to the corresponding Child Node 1.

In the example shown in FIG. 9, in stage ST03, Child Node 1 evaluates a degree of interference on UE2 after receiving the interference measurement. For example, Child Node 1 compares the received interference measurement with a predetermined threshold, and when the interference measurement exceeds the threshold, Child Node 1 notifies Master Node of the comparison result. For example, Child Node 1 may generate a link switch attempt request based on the comparison result and send it to Master Node.

In addition, Child Node 1 may also notify UE2 of the comparison result, such as a link switch attempt instruction generated based on the comparison result, to instruct the UE2 to make preparation for accessing Master Node. The link switch attempt instruction can be a simple instruction that triggers an initial access process between UE2 and Master Node, and it can also contain more information required for UE2's initial access, such as the cell ID and BWP of Master Node, so that UE2 can quickly access Master Node.

When receiving the link switch attempt request based on the comparison result, Master Node determines whether the access link needs to be switched. As described above, Master Node can determine to switch once the link switch attempt request is received. Alternatively, Master Node may also consider other factors such as link quality, available DMRS ports, and available transmission resources.

Master Node performs beam training for UE2 to determine the transmitting beam and receiving beam to be used. At the same time, UE2 can determine a gain $\Delta_{R,2}^{DL}$ of the optimal downlink quality of the link between UE2 and Master Node during the beam training over the downlink quality of the existing access link between UE2 and Child Node 1, and feed it back to Master Node. If the gain $\Delta_{R,2}^{DL}$ of the downlink quality fed back by UE2 exceeds a certain threshold, Master Node may determine to switch the link. Alternatively, Master Node may also collect a gain $\Delta_{R,3}^{DL}$ of the optimal downlink quality of the link between UE3 and Master Node during the beam training for UE3 over the downlink quality of the existing access link between UE3 and Child Node 2. By comparing the link quality gains of UE2 and UE3, Master Node can determine whether to switch the access link used by UE2 or the access link used by UE3.

If UE2 is selected as the user to be switched, in stage ST04, Master Node can establish a direct access link between it and UE2, and send to Child Node 1 an instruction to disconnect the access link between Child Node 1 and UE2, so as to achieve the link switching.

Figure 10:
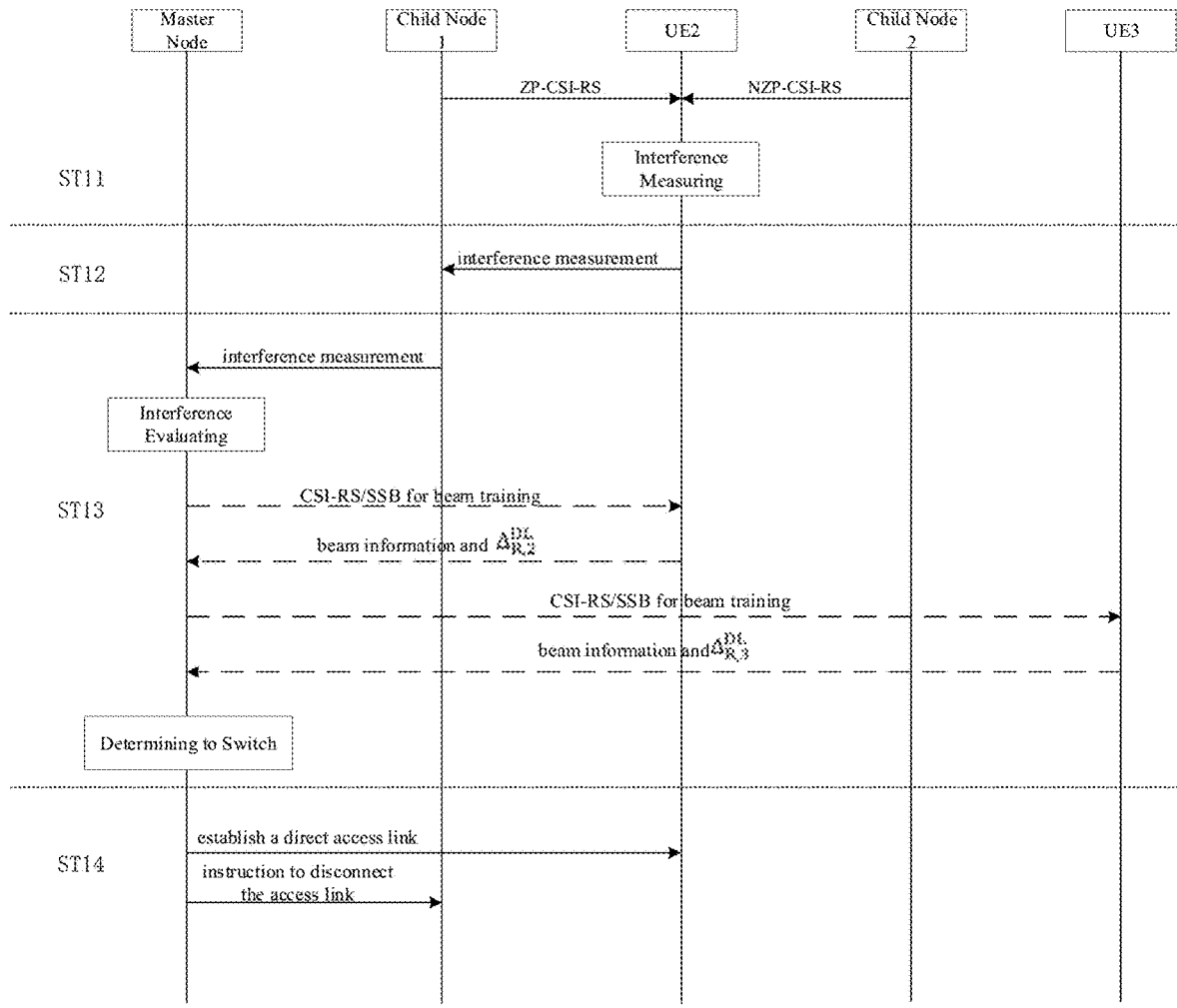

FIG. 10 illustrates a signaling flowchart of another example of the inter-tier link switching according to the first embodiment.

FIG. 10 differs from FIG. 9 in that the evaluation of interference is performed at Master Node instead of at Child Node 1. Specifically, in stage ST13, Child Node 1 forwards the interference measurement received from the UE2 to Master Node. Then, Master Node can compare the received interference measurement with a predetermined threshold to evaluate the degree of interference on UE2. If the interference measurement exceeds the predetermined threshold, Master Node determines whether the access link needs to be switched. The operations in other stages of FIG. 10 are similar to those of FIG. 9, and the description will not be repeated here.

Next, an electronic device and a communication method that can implement the first embodiment of the present disclosure are described.

Figure 11A:
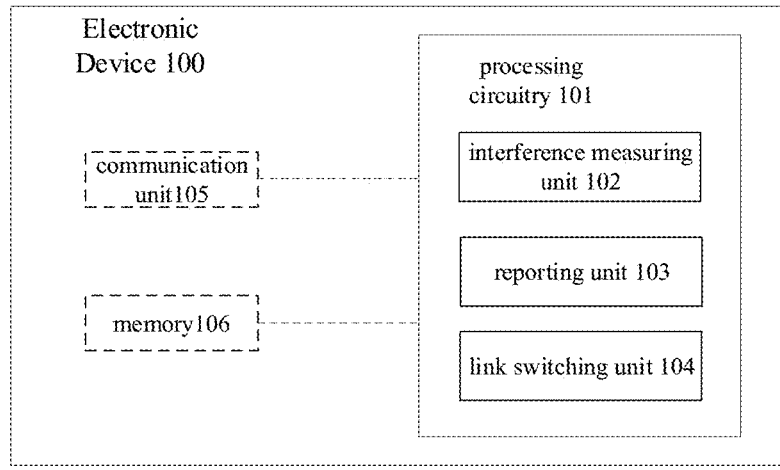
FIGS. 11A and 11B show an electronic device and a communication method for user equipment according to the first embodiment of the present disclosure.

FIG. 11A is a block diagram illustrating an electronic device 100 for UE. The electronic device 200 may be a UE or a component of the UE. The UE accesses the first node in the IAB system via a wireless access link, and the first node communicates with the second node in the IAB system via a wireless backhaul link. In the network topology of the IAB system, the second node is a parent node of the first node.

As shown in FIG. 11A, the electronic device 100 includes a processing circuitry 101. The processing circuitry 101 may be configured to perform the communication method shown in FIG. 11B. The processing circuitry 101 includes at least an interference measuring unit 102, a reporting unit 103, and a link switching unit 104.

Figure 11B:
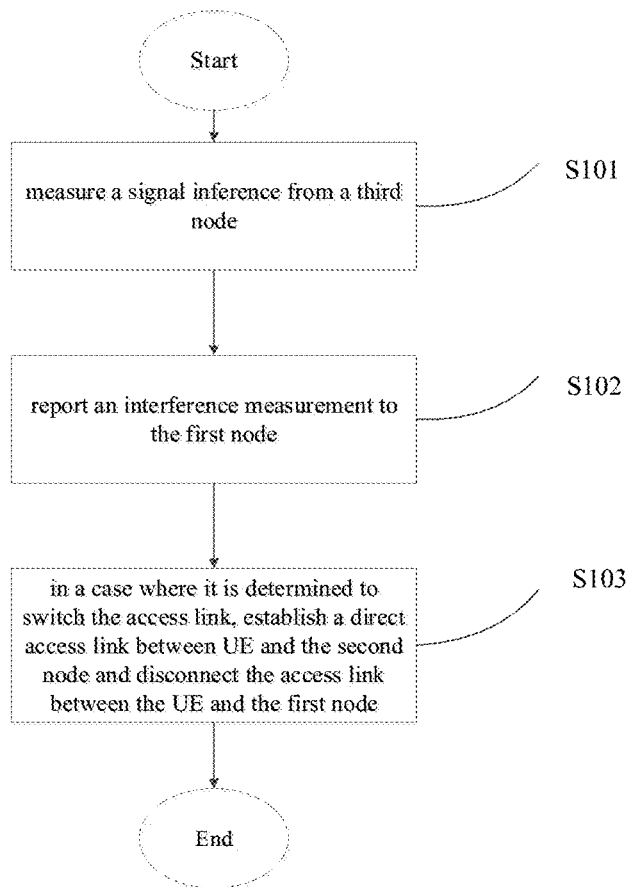

The interference measuring unit 102 of the processing circuitry 101 is configured to measure a signal interference from a third node in the IAB system (i.e., to perform step S101 in FIG. 11B). In a case where the second node is also a parent node of the third node, the second node can allocate NZP-CSI-RS resources to the third node, so that the third node can transmit NZP-CSI-RS, and the interference measuring unit 102 of the electronic device 100 may measure the received power of the reference signal as the interference measurement.

The reporting unit 103 is configured to report the measured interference measurement to the first node (i.e., to perform step S102 in FIG. 11B). The interference measurement can be used to evaluate the severity of interference on the UE at the first node or the second node. Based at least in part on the interference measurement exceeding a predetermined threshold, the second node may make a determination to switch the access link used by the UE.

The link switching unit 104 is configured to establish a direct access link between the UE and the second node and disconnect the access link between the UE and the first node when the second node makes a determination to switch the access link used by the UE (i.e., to perform step S103 in FIG. 11B). In an example, only the downlink access link is switched, so that the uplink access link between the UE and the first node is maintained. Further, only the downlink data link is switched, so that the downlink control link between the UE and the first node is maintained for a quick recovery of the access link of the UE.

The electronic device 100 may further include, for example, a communication unit 105 and a memory 106.

The communication unit 105 may be configured to communicate with a base station such as the first node, the second node, and the third node under the control of the processing circuitry 101, so as to perform the transmission operation and/or reception operation as described above.

The memory 106 can store various data and instructions, such as programs and data used for operation of the electronic device 100, various data generated by the processing circuitry 101, various control signaling or service data received by the communication unit 105, data or information (such as the interference measurement) to be transmitted by the communication unit 105, and the like.

Figure 12A:
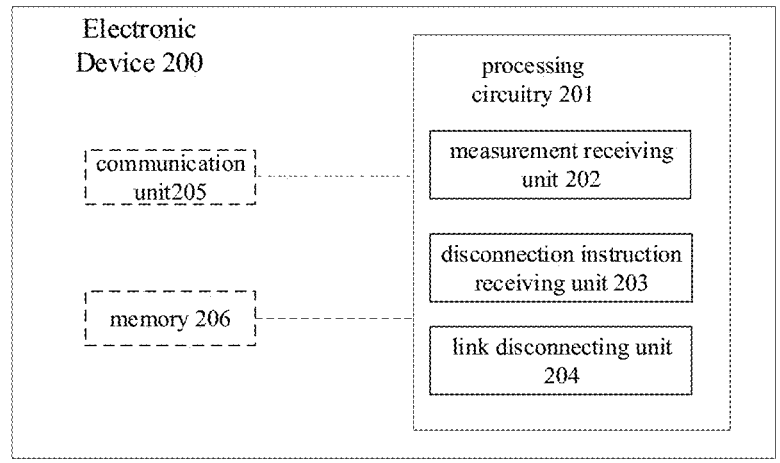
FIGS. 12A and 12B show an electronic device and a communication method for a child node according to the first embodiment of the present disclosure.

FIG. 12A is a block diagram illustrating an electronic device 200 for the first node as described above. The electronic device 200 may be a base station or a component of a base station.

As shown in FIG. 12A, the electronic device 200 includes a processing circuitry 201. The processing circuitry 201 may be configured to perform the communication method shown in FIG. 12B. The processing circuitry 201 includes at least a measurement receiving unit 202, a disconnection instruction receiving unit 203, and a link disconnecting unit 204.

Figure 12B:
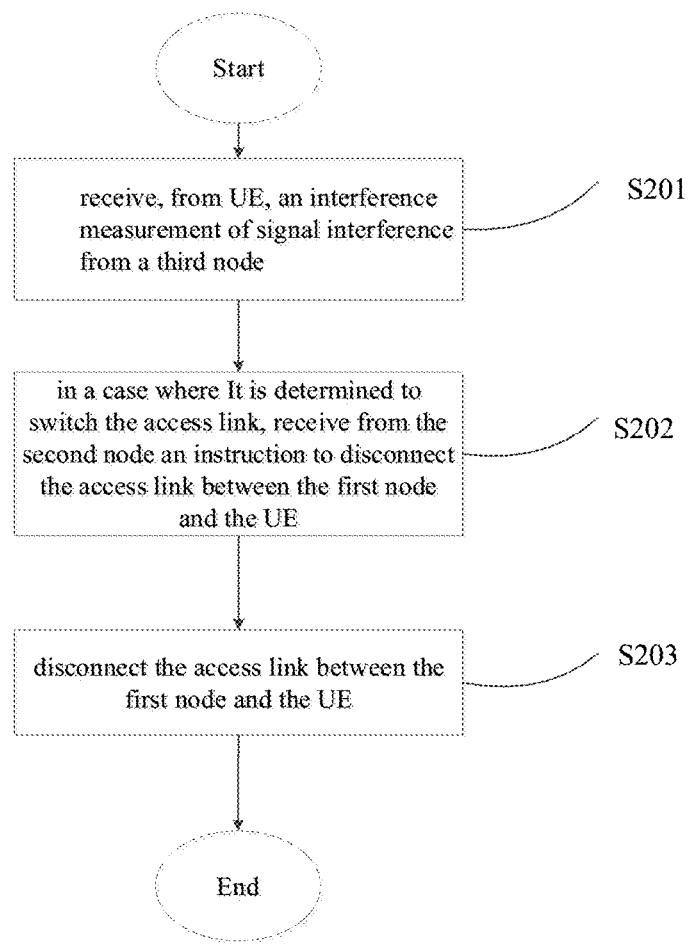

The measurement receiving unit 202 in the processing circuitry 201 is configured to receive from the UE an interference measurement obtained by the UE measuring a signal interference from a third node (i.e., to perform step S201 in FIG. 12B).

In an example, the processing circuitry 201 may further include an interference evaluating unit (not shown in the figure), and the interference evaluating unit is configured to evaluate the degree of interference on the UE based on the received interference measurement. The interference evaluating unit may compare the interference measurement with a predetermined threshold, and if the interference measurement exceeds the predetermined threshold, send a link switch attempt request to the second node, so that the second node can make a determination to switch the access link used by the UE.

In another example, the processing circuitry 201 may further include a measurement forwarding unit (not shown in the figure), and the measurement forwarding unit is configured to forward the received interference measurement to the second node. The second node evaluates the degree of interference on the UE based on the received interference measurement. The second node may compare the interference measurement with a predetermined threshold, and make a determination to switch the access link used by the UE based at least in part on the interference measurement exceeding the predetermined threshold.

In a case where the second node determines to switch the access link used by the UE, the disconnection instruction receiving unit 203 of the processing circuitry 201 receives an instruction from the second node to disconnect the access link between the first node and the UE (i.e., to perform step S202 in FIG. 12B). In response to receiving the instruction, the link disconnection unit 204 controls the first node to disconnect the access link between the first node and the UE (i.e., to perform step S203 in FIG. 12B). For example, the first node may only disconnect the downlink between it and the UE. Further, the first node may only disconnect the downlink data link between it and the UE.

The electronic device 200 may further include, for example, a communication unit 205 and a memory 206.

The communication unit 205 may be configured to communicate with the second node and the UE under the control of the processing circuitry 201, so as to perform the transmission operation and/or reception operation described above.

The memory 206 may store various data and instructions, such as the interference measurement received from the UE, programs and data for operation of the electronic device 200, various data generated by the processing circuitry 201, data to be transmitted by the communication unit 205, and the like.

Figure 13A:
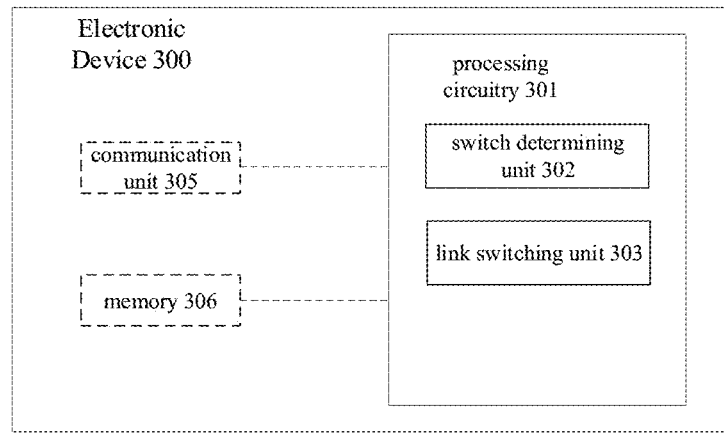
FIGS. 13A and 13B show an electronic device and a communication method for a master node according to the first embodiment of the present disclosure.

FIG. 13A is a block diagram illustrating an electronic device 300 for the second node as described above. The electronic device 300 may be a base station or a component of a base station.

As shown in FIG. 13A, the electronic device 300 includes a processing circuitry 301. The processing circuitry 301 may be configured to perform the communication method shown in FIG. 13B. The processing circuitry 301 includes at least a switch determining unit 302 and a link switching unit 303.

Figure 13B:
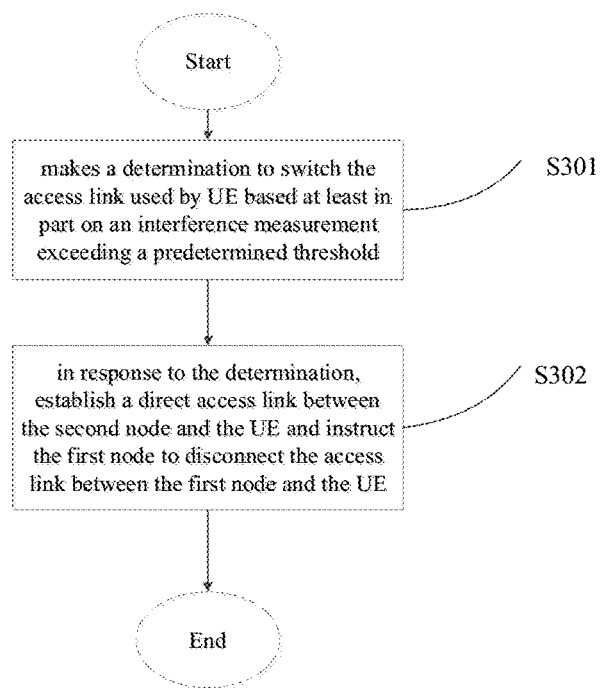

The switch determining unit 302 in the processing circuitry 301 is configured to determine the access link used by the switching UE based at least in part on the UE's interference measurement of a signal interference from a third node exceeding a predetermined threshold (i.e., to perform Step S301 in FIG. 13B).

In an example, the processing circuitry 301 may receive a link switch attempt request sent by the first node based on a comparison result of the interference measurement with a predetermined threshold, and make a determination to switch the access link used by the UE.

In another example, the processing circuitry 301 may further include an interference evaluating unit (not shown in the figure). The interference evaluating unit is configured to receive the interference measurement forwarded by the first node, and evaluate the degree of interference on the UE based on the received interference measurement. The interference evaluating unit may compare the interference measurement with a predetermined threshold, and based at least in part on the interference measurement exceeding the predetermined threshold, the switch determining unit 302 makes a determination to switch the access link used by the UE.

In response to the determination made by the switch determining unit 302, the link switching unit 303 of the processing circuitry 301 controls to establish a direct access link between the second node and the UE, and instructs the first node to disconnect the access link between the first node and the UE (i.e., to perform step S302 in FIG. 13B). For example, the second node may establish only the downlink between it and the UE, and instruct the first node to disconnect the downlink between it and the UE. Further, the second node may establish only the downlink data link between it and the UE, and instruct the first node to disconnect the downlink data link between it and the UE.

The electronic device 300 may further include, for example, a communication unit 305 and a memory 306.

The communication unit 305 may be configured to communicate with the first node and the UE under the control of the processing circuitry 301, so as to perform the transmission operation and/or reception operation described above.

The memory 306 can store various data and instructions, such as the interference measurement received from the UE, the link switch attempt request received from the first node, programs and data used for operation of the electronic device 300, and various data generated by the processing circuitry 301, data to be transmitted by the communication unit 305, and the like.

The processing circuitry 101, 201 or 301 described above may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

The communication unit 105, 205 or 305 described above may be implemented as a transmitter or transceiver, including communication components such as an antenna array and/or a radio frequency link. The communication unit 105, 205 or 305 is drawn with a dashed line because it may also be located outside the electronic device 100, 200 or 300, respectively.

The memory 106, 206 or 306 is drawn with a dashed line because it may also be located within the processing circuitry 101, 201 or 301, or outside the electronic device 100, 200 or 300. The memory 106, 206 or 306 may be a volatile memory and/or a non-volatile memory. For example, the memory 106, 206 or 306 may include, but is not limited to, random access memory (RAM), dynamic random access memory (DRAM), static random access memory (SRAM), read only memory (ROM), and flash memory.

The Second Embodiment

The second embodiment of the present disclosure provides downlink MIMO transmission based on inter-tier integration.

As described in the previous chapters, the IAB node such as Child Node 1 or Child Node 2 shown in FIG. 4 can not only operate in the Decode and Forward (DF) mode, but also can operate in the Amplify and Forward (AF) mode.

In the DF mode, since the IAB node needs to decode and re-encode the transmission data passing through it, the two layers before and after the IAB node are isolated from each other in terms of the transmission data.

In the AF mode, the IAB node amplifies and forwards all received signals, including useful signals, noise, and interference. It can be simply considered that the IAB node is an "amplifier" between the two tiers, and it is transparent for the parent node and the child node/UE.

In view of the characteristic of the IAB node in the AF mode, the IAB node will amplify and accumulate the noise and interference from the previous tier in the next tier, so the applicability of the AF mode may be determined according to current communication conditions. For example, when it is detected that the SNR of the downlink backhaul link in the previous tier is high (for example, higher than a certain value) and the modulation order is low (for example, belonging to certain modulation schemes), the IAB node can be set to operate in the AF mode, or operate in the AF mode at least in the downlink direction. Then, the IAB node can use UCI to notify its parent node of its operating mode.

Alternatively, the parent node of the IAB node can also collect information about SNR or the like from the IAB node, and configure the IAB node to operate in the AF mode or operate in the AF mode at least in the downlink direction with DCI, according to SNR, modulation order or the like.

Referring again to FIG. 4, taking Child Node 1 as an example, when Child Node 1 is in the AF mode, the backhaul link in the first tier and the access link in the second tier are integrated, and due to the transparency of Child Node 1, there is an equivalent integrated channel formed by connecting the two channels in series between Master Node and the UE (for example, UE1 or UE2). At this time, the inter-small-cell interference in the second tier can be regarded as intra-cell interference in the integrated tier.

According to the second embodiment of the present disclosure, the master node suppresses such intra-cell interference by using precoding. For this reason, the master node needs to acquire integrated channel state information (ICSI) of the equivalent baseband integrated channel.

Figure 14:
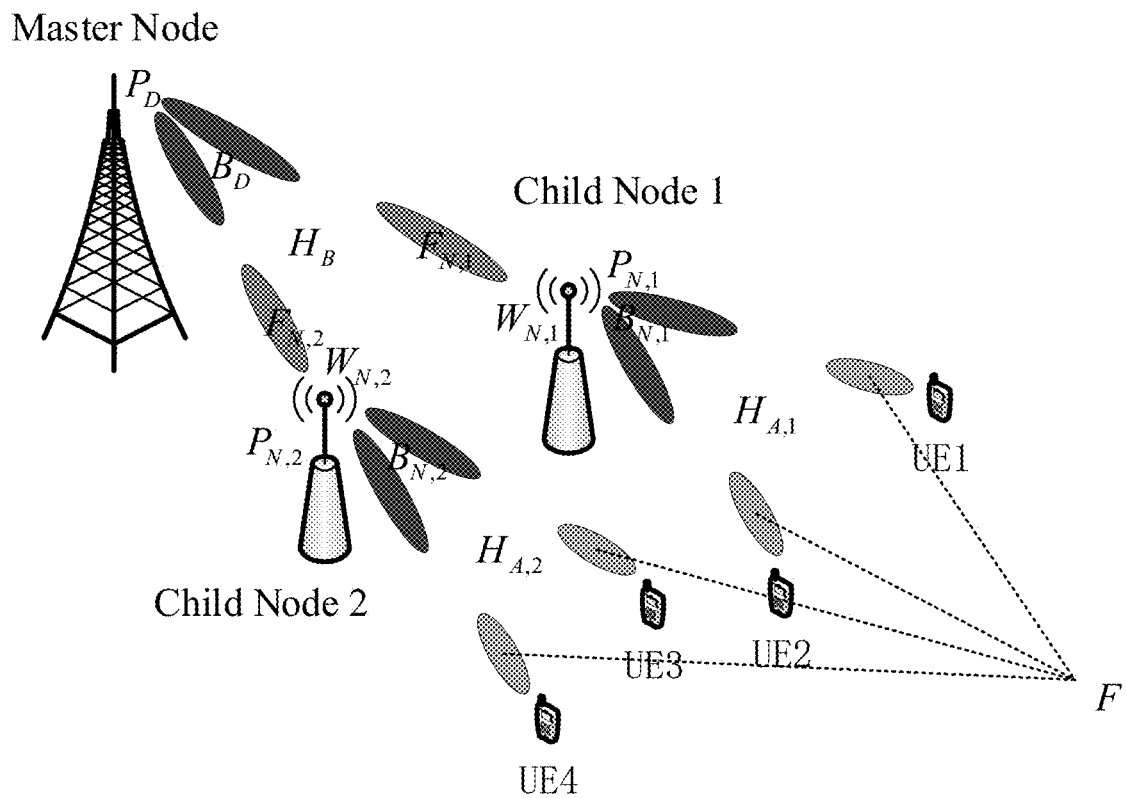
FIG. 14 shows a transmission model of inter-tier integrated transmission according to the second embodiment of the present disclosure.

FIG. 14 is a transmission model of the integrated channel through Child Node 1 and Child Node 2 as shown in FIG. 4. To simplify the model, the direct access user UE5 in the first tier is ignored.

First, the downlink transmission model in the first tier can be expressed as:

$$\tilde{y}_N = W_N F_N H_B B_D P_D x + W_N F_N n_N, \text{ or}$$

$$\begin{bmatrix} \tilde{y}_{N,1} \\ \tilde{y}_{N,2} \end{bmatrix} = \begin{bmatrix} W_{N,1} & \\ & W_{N,2} \end{bmatrix} \begin{bmatrix} F_{N,1} & \\ & F_{N,2} \end{bmatrix} \begin{bmatrix} H_{B,1} \\ H_{B,2} \end{bmatrix} B_D P_D x + \begin{bmatrix} W_{N,1} & \\ & W_{N,2} \end{bmatrix} \begin{bmatrix} F_{N,1} & \\ & F_{N,2} \end{bmatrix} \begin{bmatrix} n_{N,1} \\ n_{N,2} \end{bmatrix}$$

Among them, $\tilde{y}_{N,j} \in \mathbb{C}^{2 \times 1}$ is received symbol of the j-th (j=1, 2) child node; $W_{N,j} \in \mathbb{C}^{2 \times 2}$ is digital merging matrix of the j-th child node; $F_{N,j} \in \mathbb{C}^{2 \times M_N}$ is analog merging matrix of the j-th child node (i.e., analog beamforming matrix of the receiving beam), MN is the number of antennas configured for the child node; $H_{B,j} \in \mathbb{C}^{M_N \times M_D}$ is downlink backhaul link channel matrix of the master node and the j-th child node, Mn is the number of antennas configured for the master node; $B_D \in \mathbb{C}^{M_D \times 4}$ and $P_D \in \mathbb{C}^{4 \times 4}$ are analog beamforming matrix and digital precoding matrix of the master node, respectively; $n_{N,j} \in \mathbb{C}^{M_N \times 1}$ is additive Gaussian white noise (AWGN) vector at the child node; and $x \in \mathbb{C}^{4 \times 1}$ is symbol vector transmitted from the master node to the child nodes.

The downlink transmission model of the second tier can be expressed as:

$$r = F H_A B_N P_N y_N + Fn, \text{ or}$$

$$\begin{bmatrix} r_1 \\ r_2 \\ r_3 \\ r_4 \end{bmatrix} = \begin{bmatrix} f_1^T & & & \\ & f_2^T & & \\ & & f_3^T & \\ & & & f_4^T \end{bmatrix} H_A \begin{bmatrix} b_1 & b_2 \\ b_3 & b_4 \end{bmatrix} \begin{bmatrix} P_{N,1} & \\ & P_{N,2} \end{bmatrix} \begin{bmatrix} y_{N,1} \\ y_{N,2} \end{bmatrix} + Fn$$

Among them, $r_k$ (k=1, 2, 3, 4) is received symbol of the k-th UE; $f_k \in \mathbb{C}^{M \times 1}$ is receive beam vector of the k-th UE, and M is the number of antennas configured for each UE; $H_A \in \mathbb{C}^{4M \times 2M_N}$ is downlink access link channel matrix between the UE and two child nodes; $b_k \in \mathbb{C}^{M_N \times 1}$ is transmitting beam vector at the child node corresponding to the k-th UE; $P_{N,j} \in \mathbb{C}^{2 \times 2}$ is digital precoding matrix at the j-th child node; $y_{N,j} \in \mathbb{C}^{2 \times 1}$ is transmitted symbol for the j-th child node to its access user; and $n \in \mathbb{C}^{4 \times 1}$ is AWGN vector at the UE.

When both Child Node 1 and Child Node 2 operate in the AF mode, there is:

$$y_{N,j} = \Gamma_{N,j} \tilde{y}_{N,j}$$

Among them, $\delta_{N,j} \in \mathbb{R}^{2 \times 2}$ is a diagonal matrix, representing a magnification factor of the j-th child node. Then, the downlink transmission model in the integrated tier can be expressed as:

$$r = F H_A B_N P_N \Gamma_N (W_N F_N H_B B_D P_D x + W_N F_N n_N) + Fn =$$

$$F H_A B_N P_N \Gamma_N W_N F_N H_B B_D P_D x + (F H_A B_N P_N \Gamma_N W_N F_N n_N + Fn) =$$

$$F H_{int} B_D P_D x + (F H_A T n_N + Fn)$$

Among them, $H_{int} = H_A B_N P_N \Gamma_N W_N F_N H_B$ represents integrated downlink channel between the master node and the UE; $T = B_N P_N \Gamma_N W_N F_N$ represents integrated matrix at the child node; in particular, the digital part of the integrated matrix, i.e., the digital merging matrix $W_N$ and the precoding matrix $P_N$ may employ an identity matrix to reduce the calculation overhead and processing delay at the child nodes. Fixing the analog beamforming matrix $B_D$ of the master node and the merging vector F of the child nodes, the master node can recalculate the digital precoding matrix $P_D$ to eliminate the inter-user interference within the integrated tier after obtaining the equivalent baseband integrated downlink channel matrix $H_{BB} = F H_{int} B_D$.

It can be seen from the above transmission model that, since the child node operates in the AF mode, the noise of the backhaul link is also amplified and forwarded, the superimposed noise is $FH_A T n_N + Fn$, and the accumulated noise of the first tier $FH_A T n_N$ has a greater influence than the second tier.

The acquisition of ICSI for the equivalent baseband integrated downlink channel can be performed through reference signals.

In an example, if the IAB system is a TDD system, the uplink integrated channel and the downlink integrated channel have channel reciprocity. Then, the UE may send an uplink reference signal such as SRS to the master node to acquire ICSI. Name $\phi \in \mathbb{C}^{4 \times 4}$ as the SRS matrix sent by 4

UEs, and $\phi\phi^H=I_4$ is satisfied, then the signal received at the child node can be expressed as $$Y_{N,SRS}=B_N^T H_A^T F^T \phi$$

Then, the child node amplifies and forwards $Y_{N,CSI-RS}$ to the master node, and the signal received by the master node can be expressed as:

$$Y_{D,SRS}=B_D^T H_B^T F_B^T \Gamma_N Y_{N,SRS}=(FH_{int}B_D)T^\psi=H_{BB}^T\phi$$

Then $H_{BB}$ can be obtained from $Y_{D,SRS}\phi^H$.

In another example, if the IAB system is not a TDD system, for example, it is a frequency-division duplex (FDD) system, the master node may send downlink reference signals such as CSI-RS to the UE to acquire ICSI. Name $\phi \in \mathbb{C}^{4\times 4}$ as the CSI-RS matrix sent by the master node to the four UEs, and $\phi\phi^H=I_4$ is satisfied, then the signal received at the child node can be expressed as $$Y_{N,CSI-RS}=F_N H_B B_D \phi$$

Then, the child node amplifies and forwards $Y_{N,SRS}$ to the UE, and the signal received by the UE can be expressed as:

$$Y_{D,CSI-RS}=FH_A B_N P_N \Gamma_N Y_{N,SRS}=FH_{int}B_D\phi=H_{BB}\phi$$

Then $H_{BB}$ can be obtained from $Y_{D,CSI-RS}\phi^H$.

Based on the acquired ICSI of the downlink baseband integrated channel, the master node can calculate a precoding matrix $P_D$ for MIMO transmission, and use the calculated precoding matrix to precode data streams for multi-user MIMO transmission.

By precoding for MIMO transmission at the master node level with respect to all of associated access users (including UEs directly accessing the master node and UEs accessing the child nodes of the master node), the inter-user interference can be reduced while the system capacity can be increased.

Since the child node does not decode and re-encode the data stream passing through it, the number of downlink DMRS ports $K_{B,N,j}^{DMRS}$ that the child node recommends the master node to configure for the backhaul link is equal to the number of DMRS ports $K_{A,N,j}^{DMRS}$ of all access links associated with the child node. The master node sets the number of downlink DMRS ports $K_{D,j}^{DMRS}$ configured for the backhaul link to be equal to the recommended number of downlink DMRS ports $K_{B,N,j}^{DMRS}$, whereby the DMRS ports on the backhaul link are equal to those on the access link.

Although the inter-tier integrated transmission according to the second embodiment of the present disclosure is described above with reference to the single-hop two-tier IAB system shown in FIG. 4, it should be understood that the inter-tier integrated transmission according to the second embodiment is also applicable to a multi-hop IAB system. In the multi-hop IAB system, all child nodes through which the integrated channel passes operate in the AF mode, and the transmission model can be established similarly to that in FIG. 14, except that more than two channels are integrated.

A signaling flow of the inter-tier integrated transmission according to the second embodiment of the present disclosure is described below.

Figure 15:
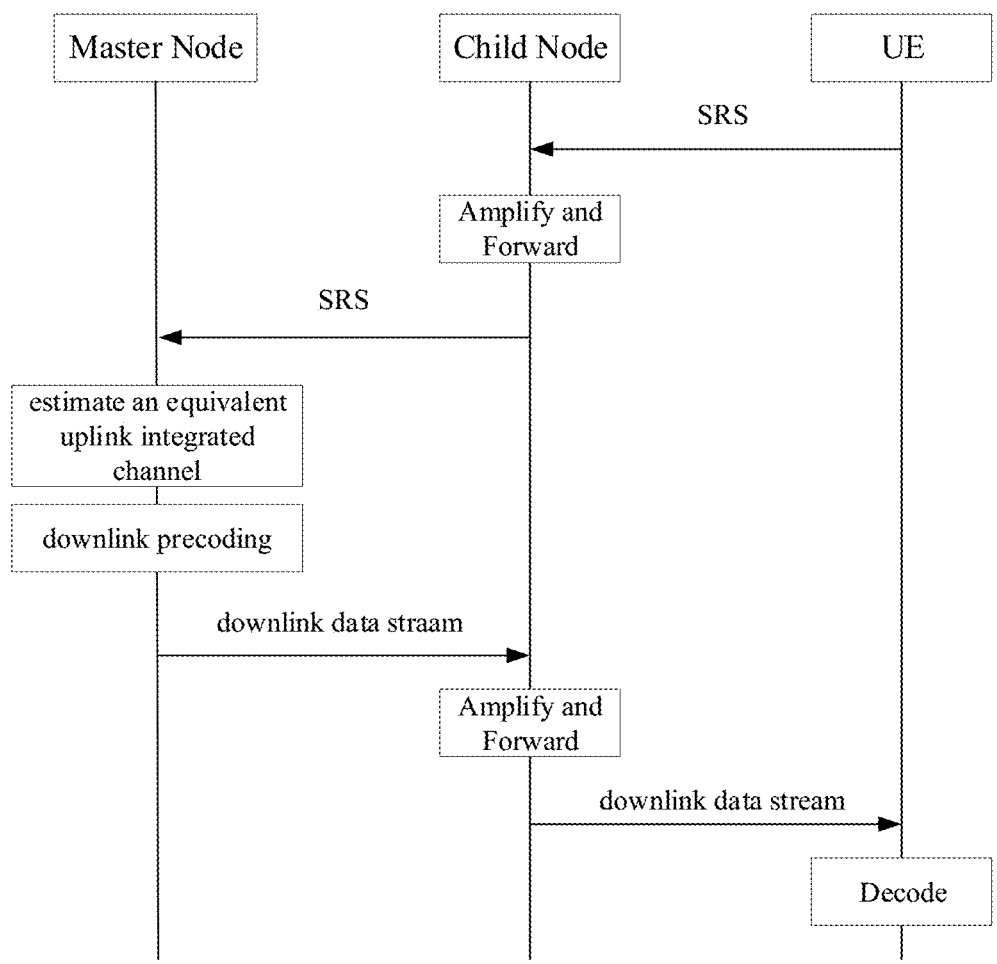
FIGS. 15 and 16 show examples of signaling flow of the inter-tier integrated transmission according to the second embodiment of the present disclosure.

FIG. 15 illustrates a signaling flow of an example of the inter-tier integrated transmission according to the second embodiment. As shown in FIG. 15, first, each UE transmits SRS to the master node via the child node. The SRS may be an SRS resource allocated by the master node to the UE through spatial relation information (for example, PUCCH-SpatialRelationInfo or SRS-SpatialRelationInfo). After receiving the SRS, the child node operating in the AF mode amplifies and forwards the SRS to the master node.

According to the above discussion, the master node can estimate the equivalent uplink baseband integrated channel with the received SRS to acquire the ICSI of the uplink baseband integrated channel, such as channel quality indicator (CQI), precoding matrix indicator (PMI), rank indicator (RI) or the like. In the TDD system, the uplink baseband integrated channel through the uplink access link, the child node and the uplink backhaul link has channel reciprocity relative to the downlink baseband integrated channel through the downlink backhaul link, the child node and the downlink backhaul link, and the master node can acquire the ICSI of the downlink baseband integrated channel. The master node calculates a precoding matrix for MIMO transmission based on the acquired ICSI of the downlink baseband integrated channel, and performs digital precoding on the transmitted data stream.

The downlink data stream is amplified and forwarded by the child node and received by the UE. The UE can perform a decoding operation to obtain data destined for it from the data stream.

Figure 16:
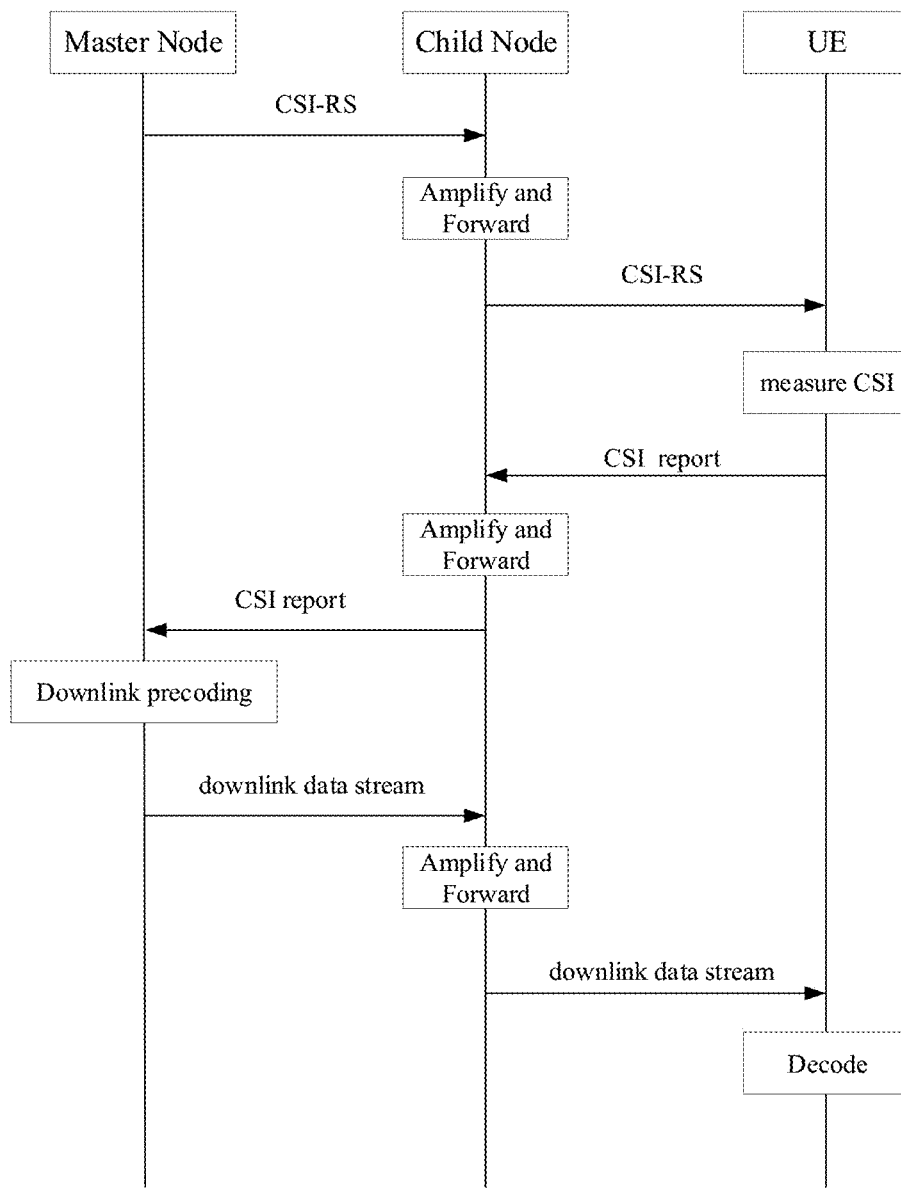

FIG. 16 illustrates a signaling flow of another example of the inter-tier integrated transmission according to the second embodiment. As shown in FIG. 16, first, the master node transmits CSI-RS to the UE via the child node. After receiving the CSI-RS, the child node operating in the AF mode amplifies and forwards the CSI-RS to the UE.

The UE can estimate the downlink baseband integrated channel by measuring the CSI-RS, and report it in a form of CSI report. The CSI report can include ICSI such as CQI, PMI, and RI. The CSI report is received by the master node after being amplified and forwarded by the child node.

Then, according to the above discussion, the master node can estimate the equivalent downlink baseband integrated channel with the received CSI-RS to acquire the ICSI of the downlink baseband integrated channel. The master node calculates a precoding matrix for MIMO transmission based on the acquired ICSI of the downlink baseband integrated channel, and performs digital precoding on the transmitted data stream.

The downlink data stream is amplified and forwarded by the child node and received by the UE. The UE can perform a decoding operation to obtain data destined for it from the data stream.

Next, an electronic device and a communication method that can implement the second embodiment of the present disclosure are described.

Figure 17A:
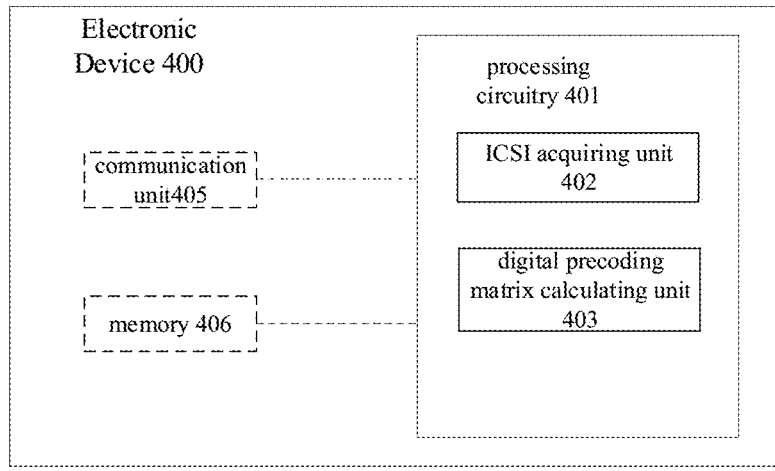
FIGS. 17A and 17B show an electronic device and a communication method for a master node according to a second embodiment of the present disclosure.

FIG. 17A is a block diagram illustrating an electronic device 400 for a node (denoted as a second node) in an IAB system. The electronic device 400 may be a base station or a component of a base station. The UE accesses a first node in the IAB system through a wireless access link, and the first node communicates with the second node in the IAB system through a wireless backhaul link. In the network topology of the IAB system, the second node is a parent node of the first node. The first node operates in the Amplify and Forward (AF) mode.

As shown in FIG. 17A, the electronic device 400 includes a processing circuitry 401. The processing circuitry 401 may be configured to perform the communication method shown in FIG. 14B. The processing circuitry 401 includes at least an ICSI acquiring unit 402 and a digital precoding matrix calculating unit 403.

Figure 17B:
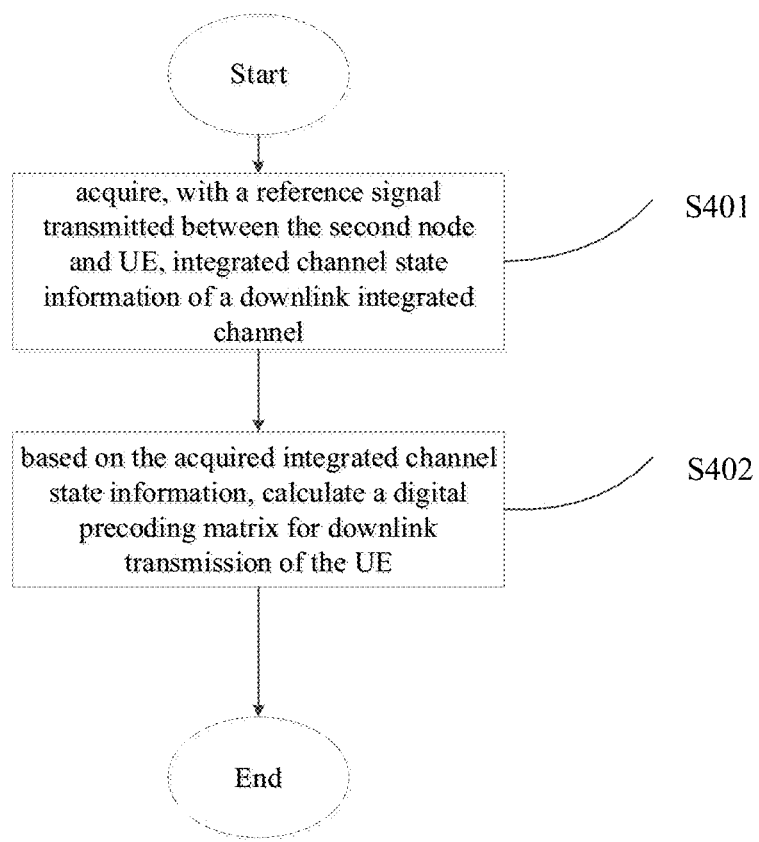

The ICSI acquiring unit 402 in the processing circuitry 401 is configured to acquire integrated channel state information ICSI of the downlink baseband integrated channel through the backhaul link, the first node and the access link with a reference signal transmitted between the second node and the user equipment (i.e., to perform step S401 in FIG. 17B). In a TDD system, the reference signal may be SRS transmitted by the UE and amplified and forwarded to the second node by the first node, and the ICSI acquiring unit 402 uses the measurement of the SRS to perform channel estimation. Alternatively, for example, in an FDD system, the reference signal may be CSI-RS transmitted by the second node and amplified and forwarded to the first node by the first node, and the UE feeds back the measurement to the master node for the master node to determine the ICSI.

The data precoding matrix calculating unit 403 is configured to calculate a digital precoding matrix for downlink transmission of the UE based on the acquired link channel state information (i.e., to perform step S402 in FIG. 17B).

The electronic device 400 may further include, for example, a communication unit 405 and a memory 406.

The communication unit 405 may be configured to communicate with the first node and the UE under the control of the processing circuitry 401, so as to perform the transmission operation and/or reception operation described above.

The memory 406 may store various data and instructions, such as the CSI-RS measurement received from the UE, programs and data used for operation of the electronic device 400, various data generated by the processing circuitry 401, data to be transmitted by the communication unit 405, and the like.

Figure 18A:
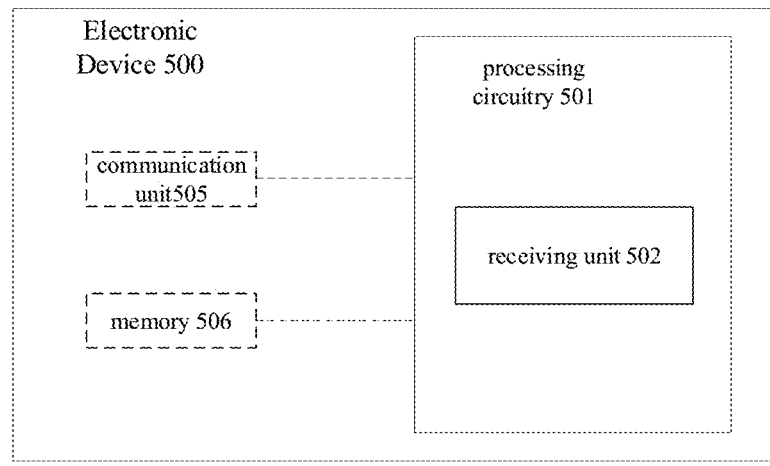
FIGS. 18A and 18B show an electronic device and a communication method for user equipment according to a second embodiment of the present disclosure.

FIG. 18A is a block diagram illustrating an electronic device 500 for UE. The electronic device 500 may be a UE or a component of the UE. The UE accesses a first node in the IAB system through a wireless access link, and the first node communicates with a second node in the IAB system through a wireless backhaul link. In the network topology of the IAB system, the second node is a parent node of the first node. The first node operates in the Amplify and Forward (AF) mode.

As shown in FIG. 18A, the electronic device 500 includes a processing circuitry 501. The processing circuitry 501 may be configured to perform the communication method shown in FIG. 18B. The processing circuitry 501 includes at least a receiving unit 502.

Figure 18B:
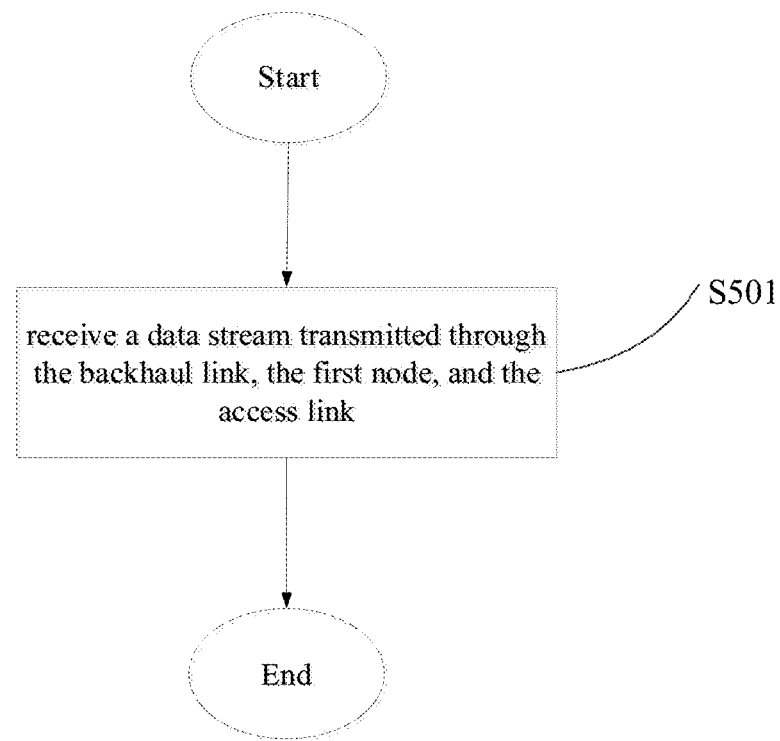

The receiving unit 502 is configured to receive the data stream transmitted on a downlink integrated channel through the backhaul link, the first node, and the access link (i.e., to perform step S501 in FIG. 18B). Wherein the data stream is pre-coded at the second node using a digital pre-coding matrix, and the digital pre-coding matrix is calculated based on integrated channel state information of the downlink baseband integrated channel. The second node acquires the integrated channel state information through a reference signal (for example, SRS or CSI-RS) transmitted between the second node and the UE.

The electronic device 500 may further include, for example, a communication unit 505 and a memory 506.

The communication unit 505 may be configured to communicate with a base station such as a first node and a second node under the control of the processing circuitry 501 to perform the transmission operation and/or reception operation described above.

The memory 506 can store various data and instructions, such as programs and data for operation of the electronic device 500, various data generated by the processing circuitry 501, various control signaling or service data received by the communication unit 505, data or information to be transmitted by the communication unit 505, etc.

Figure 19A:
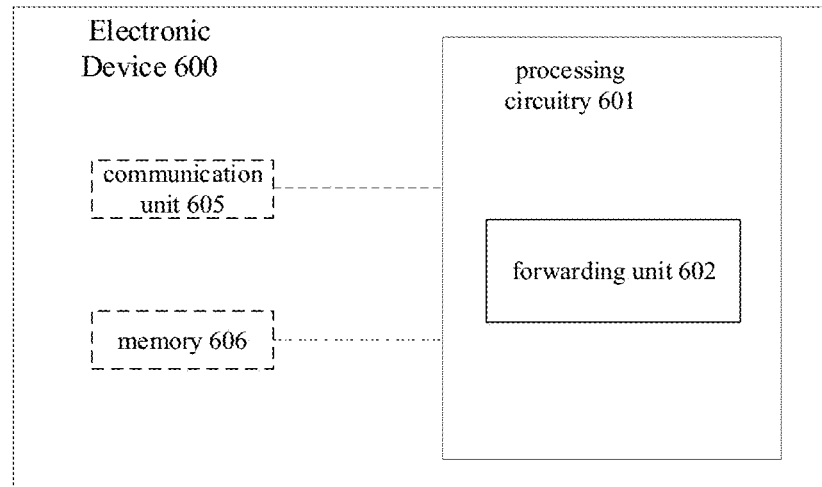
FIGS. 19A and 19B show an electronic device and a communication method for a child node according to the second embodiment of the present disclosure.

FIG. 19A is a block diagram illustrating an electronic device 600 for the above-mentioned first node. The electronic device 600 may be a base station or a component of a base station. The first node operates in the AF mode.

As shown in FIG. 19A, the electronic device 600 includes a processing circuitry 601. The processing circuitry 601 may be configured to perform the communication method shown in FIG. 19B. The processing circuitry 601 includes at least a forwarding unit 604.

Figure 19B:
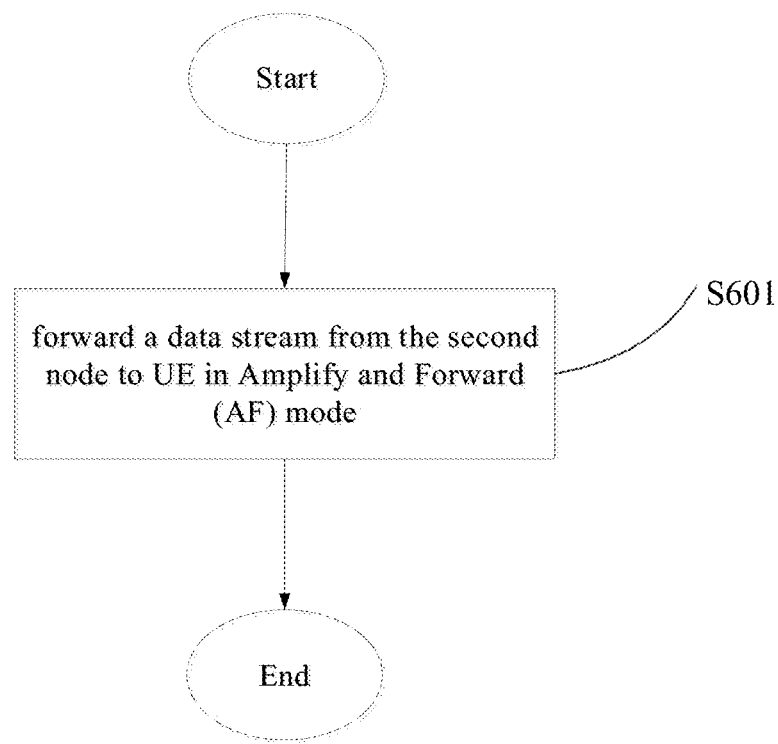

The forwarding unit 604 is configured to amplify and forward transmission data passing through the first node, such as the data stream from the second node to the UE (i.e., to perform step S601 in FIG. 19B). Wherein the data stream is pre-coded at the second node using a digital pre-coding matrix, and the digital pre-coding matrix is calculated based on integrated channel state information of the downlink baseband integrated channel. The second node acquires the integrated channel state information with a reference signal (for example, SRS or CSI-RS) transmitted between the second node and the UE.

The electronic device 600 may further include, for example, a communication unit 605 and a memory 606.

The communication unit 605 may be configured to communicate with the second node and the UE under the control of the processing circuitry 601, so as to perform the transmission operation and/or reception operation described above.

The memory 606 can store various data and instructions, such as programs and data for operation of the electronic device 600, various data generated by the processing circuitry 601, data received by the communication unit 605, data to be transmitted by the communication unit 605, and the like.

The processing circuitry 401, 501 or 601 described above may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

The communication unit 405, 505 or 605 described above may be implemented as a transmitter or transceiver, including communication components such as an antenna array and/or a radio frequency link. The communication unit 405, 505 or 605 is drawn with a dashed line because it may also be located outside the electronic device 400, 500 or 600, respectively.

The memory 406, 506 or 606 is drawn with a dashed line because it may also be located within the processing circuitry 401, 501 or 601, or outside the electronic device 400, 500 or 600. The memory 406, 506 or 606 may be a volatile memory and/or a non-volatile memory. For example, the memory 406, 506 or 606 may include, but is not limited to, random access memory (RAM), dynamic random access memory (DRAM), static random access memory (SRAM), read only memory (ROM), and flash memory.

The various aspects of the embodiments of the present disclosure have been described above in detail, but it should be noted that, the structure, arrangement, type, number, etc. of the antenna array, ports, reference signals, communication devices, communication methods and the like are shown for purpose of description, but are not intended to limit the aspects of the present disclosure to these specific examples. The sequence of method steps and signaling flows as described is not limited to those exemplified in the present disclosure, and some of the steps and flows may be changed or performed in parallel.

It should be understood that various units of the electronic devices 100, 200, 300, 400, 500 and 600 described in the above embodiments are only logical modules divided according to specific functions they implement, and are not limited to specific implementations. In actual implementation, the foregoing units may be implemented as independent physical entities, or may also be implemented by a single entity (for example, a processor (CPU or DSP, etc.), an integrated circuit, etc.).

[Exemplary Implementations of the Present Disclosure]

According to the embodiments of the present disclosure, various implementations for practicing concepts of the present disclosure can be conceived, including but not limited to:

1. An electronic device on side of user equipment, there being an access link between the user equipment and a first node of an integrated access and backhaul (IAB) system, there being a backhaul link between the first node and a second node of the IAB system, wherein the second node is a parent node of the first node in network topology of the IAB system, characterized in the electronic device comprising: a processing circuitry configured to measure a signal inference from a third node; report an interference measurement to the first node; and in a case where the second node makes a determination to switch the access link used by the user equipment based at least in part on the interference measurement exceeding a predetermined threshold, establish a direct access link between the user equipment and the second node and disconnect the access link between the user equipment and the first node.

2. The electronic device of 1, wherein disconnecting the access link between the user equipment and the first node includes disconnecting only a downlink access link between the user equipment and the first node.

3. The electronic device of 2, wherein disconnecting the downlink access link between the user equipment and the first node includes disconnecting only a downlink data link between the user equipment and the first node without disconnecting a downlink control link between the user equipment and the first node.

4. The electronic device of 2 or 3, wherein the direct access link between the user equipment and the second node and the uplink access link between the user equipment and the first node operate on different frequency bands.

5. The electronic device of 1 or 2, wherein establishing the direct access link between the user equipment and the second node includes establishing only a downlink access link between the user equipment and the second node.

6. The electronic device of 1 or 2, wherein establishing the direct access link between the user equipment and the second node includes establishing only a downlink data link between the user equipment and the second node.

7. The electronic device of 1, wherein the interference measurement is compared with the predetermined threshold at the first node.

8. The electronic device of 1, wherein the interference measurement is forwarded to the second node by the first node, and is compared with the predetermined threshold at the second node.

9. The electronic device of 1, wherein measuring the signal interference from the third node includes: receiving a non-zero-power channel state information reference signal (NZP-CSI-RS) transmitted by the third node; and measuring a signal power of the received NZP-CSI-RS as the interference measurement.

10. The electronic device of 1, wherein the processing circuitry is further configured to calculate a gain of an optimal downlink quality during a beam training between the user equipment and the second node over a downlink quality of the access link between the user equipment and the first node, and report the gain to the second node.

11. An electronic device for a node in an integrated access and backhaul (IAB) system, the node being referred to as the first node, there being an access link between the first node and user equipment, there being a backhaul link between the first node and a second node of the IAB system, where the second node is a parent node of the first node in network topology of the IAB system, characterized in the electronic device comprising: a processing circuitry configured to receive, from the user equipment, an interference measurement of signal interference from a third node; in a case where the second node makes a determination to switch the access link used by the user equipment based at least in part on the interference measurement exceeding a predetermined threshold, receive from the second node an instruction to disconnect the access link between the first node and the user equipment, and disconnect the access link between the first node and the user equipment.

12. The electronic device of 11, wherein disconnecting the access link between the user equipment and the first node includes disconnecting only a downlink access link between the user equipment and the first node.

13. The electronic device of 12, wherein disconnecting the downlink access link between the user equipment and the first node includes disconnecting only a downlink data link between the user equipment and the first node without disconnecting a downlink control link between the user equipment and the first node.

14. The electronic device of 11, wherein the processing circuitry is further configured to compare the received interference measurement with the predetermined threshold, and send a link switch attempt request to the second node to trigger the second node to make the determination to switch the access link used by the user equipment.

15. The electronic device of 11, wherein the processing circuitry is further configured to forward the received interference measurement to the second node for comparing with the predetermined threshold at the second node.

16. The electronic device of 11, wherein the processing circuitry is further configured to report to the second node the number of downlink DMRS ports $K_{B,N_j}^{DMRS}$ recommended to be configured for the backhaul link, the recommended number of downlink DMRS ports $K_{B,N_j}^{DMRS}$ is not greater than the number of DMRS ports $K_{A,N_j}^{DMRS}$ of all access links associated with the first node.

17. The electronic device of 11, wherein the processing circuitry is further configured to receive information including the number of downlink DMRS ports $K_{D,j}^{DMRS}$ configured by the second node for the backhaul link, where the configured number of downlink DMRS ports $K_{D,j}^{DMRS}$ is not greater than the number of downlink DMRS ports $K_{B,N_j}^{DMRS}$ recommended by the first node suggests to be configured for the backhaul link.

18. An electronic device for a node in an integrated access and backhaul (IAB) system, the node being referred to as a second node, there being a backhaul link between a first node and the second node of the TAB system, wherein the first node is a child node of the second node in network topology of the TAB system, and there is an access link between the user equipment and the first node, characterized in the electronic device comprising a processing circuitry configured to: make a determination to switch the access link used by the user equipment based at least in part on an interference measurement of signal interference from a third node by the user equipment exceeding a predetermined threshold; and in response to the determination, establish a direct access link between the second node and the user equipment and instruct the first node to disconnect the access link between the first node and the user equipment.

19. The electronic device of 18, wherein the processing circuitry is configured to establish only a downlink access link between the second node and the user equipment, and instruct the first node to disconnect a downlink access link between the first node and the user equipment.

20. The electronic device of 18, wherein the processing circuitry is further configured to: receive, from the user equipment, a gain of an optimal downlink quality during beam training between the user equipment and the second node over a downlink quality of the access link between the user equipment and the first node; in a case where the gain exceeds a certain threshold, makes a determination to switch the access link used by the user equipment.

21. The electronic device of 18, wherein the processing circuitry is further configured to: receive, from the user equipment, a first gain of an optimal downlink quality during beam training between the user equipment and the second node over a downlink quality of the access link between the user equipment and the first node; receive, from a further user equipment, a second gain of an optimal downlink quality during beam training between the further user equipment and the second node over a downlink quality of the access link between the further user equipment and the third node, wherein the signal interference from the third node is caused by a downlink transmission between the third node and the further user equipment; and in a case where the first gain exceeds the second gain, makes the determination to switch the access link used by the user equipment.

22. An electronic device for a node in an integrated access and backhaul (IAB) system, the node being referred to as a second node, there being a backhaul link between the second node and a first node of the IAB system, wherein the second node is a parent node of the first node in network topology of the IAB system, and there is an access link between the user equipment and the first node, wherein the electronic device comprises a processing circuitry configured to: acquire, with a reference signal transmitted between the second node and the user equipment, integrated channel state information of a downlink baseband integrated channel through the backhaul link, the first node, and the access link, wherein the first node operates in Amplify and Forward (AF) mode; and based on the acquired integrated channel state information, calculate a digital precoding matrix for downlink transmission of the user equipment.

23. The electronic device of 22, wherein the reference signal is sounding reference signal (SRS) transmitted from the user equipment to the second node, and the IAB system adopts time division duplex (TDD).

24. The electronic device of 22, wherein the reference signal is channel state information reference signal (CSI-RS) transmitted from the second node to the user equipment.

25. The electronic device of 22, wherein the processing circuitry is further configured to receive, from the first node, uplink control information (UCI) containing information that the first node chooses to operate in the AF mode.

26. The electronic device of 22, wherein the processing circuitry is further configured to: receive, from the first node, the number $K_{B,N_j}^{DMRS}$ of downlink DMRS ports recommended to be configured for the backhaul link, the recommended number $K_{B,N_j}^{DMRS}$ of downlink DMRS ports is equal to the number $K_{A,N_j}^{DMRS}$ of DMRS ports of all access links associated with the first node; and set the number $K_{A,N_j}^{DMRS}$ of downlink DMRS ports to be configured for the backhaul link to be equal to the recommended number $K_{B,N_j}^{DMRS}$ of downlink DMRS ports.

27. An electronic device on side of user equipment, there being an access link between the user equipment and a first node of an integrated access and backhaul (IAB) system, there being a backhaul link between the first node and a second node of the IAB system, wherein the second node is a parent node of the first node in network topology of the IAB system, characterized in the electronic device comprising: a processing circuitry configured to receive a data stream transmitted through the backhaul link, the first node, and the access link, wherein the first node operates in Amplify and Forward (AF) mode, wherein the data stream is precoded by the second node using a digital precoding matrix, wherein the digital precoding matrix is calculated based on integrated channel state information of a downlink baseband integrated channel through the backhaul link, the first node, and the access link, and wherein the integrated channel state information is acquired through a reference signal transmitted between the second node and the user equipment.

28. An electronic device for a node in an integrated access and backhaul (IAB) system, the node being referred to as a first node, there being an access link between the first node and user equipment, there being a backhaul link between the first node and a second node of the IAB system, where the second node is a parent node of the first node in network topology of the IAB system, characterized in the electronic device comprising a processing circuitry configured to forward a data stream from the second node to the user equipment in Amplify and Forward (AF) mode, wherein the data stream is precoded by the second node using a digital precoding matrix, wherein the digital precoding matrix is calculated based on integrated channel state information of a downlink baseband integrated channel through the backhaul link, the first node, and the access link, and wherein the integrated channel state information is acquired with a reference signal transmitted between the second node and the user equipment.

29. A communication method for user equipment, there being an access link between the user equipment and a first node of an integrated access and backhaul (IAB) system, there being a backhaul link between the first node and a second node of the IAB system, wherein the second node is a parent node of the first node in network topology of the IAB system, characterized in the communication method comprising: measuring a signal inference from a third node; reporting an interference measurement to the first node; and in a case where the second node makes a determination to switch the access link used by the user equipment based at least in part on the interference measurement exceeding a predetermined threshold, establishing a direct access link between the user equipment and the second node and disconnecting the access link between the user equipment and the first node.

30. A communication method for a node in an integrated access and backhaul (IAB) system, the node being referred to as the first node, there being an access link between the first node and user equipment, there being a backhaul link between the first node and a second node of the IAB system, where the second node is a parent node of the first node in network topology of the IAB system, characterized in the communication method comprising: receiving, from the user equipment, an interference measurement of signal interference from a third node; in a case where the second node makes a determination to switch the access link used by the user equipment based at least in part on the interference measurement exceeding a predetermined threshold, receiving from the second node an instruction to disconnect the access link between the first node and the user equipment, and disconnecting the access link between the first node and the user equipment.

31. A communication method for a node in an integrated access and backhaul (IAB) system, the node being referred to as a second node, there being a backhaul link between a first node and the second node of the IAB system, wherein the first node is a child node of the second node in network topology of the IAB system, and there is an access link between the user equipment and the first node, characterized in the communication method comprising: making a determination to switch the access link used by the user equipment based at least in part on an interference measurement of signal interference from a third node by the user equipment exceeding a predetermined threshold; and in response to the determination, establishing a direct access link between the second node and the user equipment and instruct the first node to disconnect the access link between the first node and the user equipment.

32. A communication method for a node in an integrated access and backhaul (IAB) system, the node being referred to as a second node, there being a backhaul link between the second node and a first node of the IAB system, wherein the second node is a parent node of the first node in network topology of the IAB system, and there is an access link between the user equipment and the first node, characterized in the communication method comprising: obtaining measurement of a reference signal transmitted between the second node and the user equipment; based on the measurement of the reference signal, acquiring integrated channel state information of a downlink baseband integrated channel through the backhaul link, the first node, and the access link, wherein the first node operates in Amplify and Forward (AF) mode; and based on the acquired integrated channel state information, calculating a digital precoding matrix for downlink transmission of the user equipment.

33. A communication method for user equipment, there being an access link between the user equipment and a first node of an integrated access and backhaul (IAB) system, there being a backhaul link between the first node and a second node of the IAB system, wherein the second node is a parent node of the first node in network topology of the IAB system, characterized in the communication method comprising: receiving a data stream transmitted through the backhaul link, the first node, and the access link, wherein the first node operates in Amplify and Forward (AF) mode, wherein the data stream is precoded by the second node using a digital precoding matrix, wherein the digital precoding matrix is calculated based on integrated channel state information of a downlink baseband integrated channel through the backhaul link, the first node, and the access link, and wherein the integrated channel state information is acquired through a reference signal transmitted between the second node and the user equipment.

34. A communication method for a node in an integrated access and backhaul (TAB) system, the node being referred to as a first node, there being an access link between the first node and user equipment, there being a backhaul link between the first node and a second node of the IAB system, where the second node is a parent node of the first node in network topology of the IAB system, characterized in the electronic device comprising: forwarding a data stream from the second node to the user equipment in Amplify and Forward (AF) mode, wherein the data stream is precoded by the second node using a digital precoding matrix, wherein the digital precoding matrix is calculated based on integrated channel state information of a downlink baseband integrated channel through the backhaul link, the first node, and the access link, and wherein the integrated channel state information is acquired with a reference signal transmitted between the second node and the user equipment.

35. A non-transitory computer readable storage medium storing executable instructions which, when executed, perform the communication method according to any of 29-34.

Application Examples of the Present Disclosure

The technology of the present disclosure can be applied to various products.

For example, the electronic device 200, 300, 400 and 600 according to the embodiments of the present disclosure can be implemented as a variety of base stations or installed in a variety of base stations, and the electronic device 100 and 500 according to the embodiments of the present disclosure can be implemented as a variety of user equipment or installed in a variety of user equipment.

The communication method according to the embodiments of the present disclosure may be implemented by various base stations or user equipment; the methods and operations according to the embodiments of the present disclosure may be embodied as computer-executable instructions, stored in a non-transitory computer-readable storage medium, and can be performed by various base stations or user equipment to implement one or more of the above-mentioned functions.

The technology according to the embodiments of the present disclosure can be made into various computer program products, which can be used in various base stations or user equipment to implement one or more of the above-mentioned functions.

The term "base station" used in this disclosure has the full breadth of its usual meaning, and includes at least a wireless communication station used as a part of a wireless communication system or a radio system to facilitate communication. The base stations mentioned in the present disclosure can be implemented as any type of base station, preferably, such as the macro gNB or ng-eNB defined in the 3GPP 5G NR standard. A gNB may be a gNB that covers a cell smaller than a macro cell, such as a pico gNB, a micro gNB, and a home (femto) gNB. Instead, the base station may be implemented as any other type of base station such as a NodeB, an eNodeB and a base transceiver station (BTS). The base station may include a main body configured to control wireless communication, and one or more remote radio heads (RRH) disposed in a different place from the main body, a wirelesss relay, a drone control tower, main control unit in an automated factory or the like. In D2D, M2M, and V2V communication scenarios, a logical entity that has a function of controlling communication can also be called a base station. In the cognitive radio communication scenario, a logical entity that plays a role of spectrum coordination can also be called a base station. In an automated factory, a logical entity that provides a network control function can be called a base station.

The user equipment may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (also called a machine type communication (MTC) terminal) that performs machine-to-machine (M2M) communication, a drone, a sensor or actuator in an automated factory or the like. Furthermore, the terminal device may be a wireless communication module (such as an integrated circuit module including a single die) mounted on each of the above terminals.

Examples of the base station and the user equipment to which the present disclosure can be applied will be described briefly below.

First Application Example of Base Station

Figure 20:
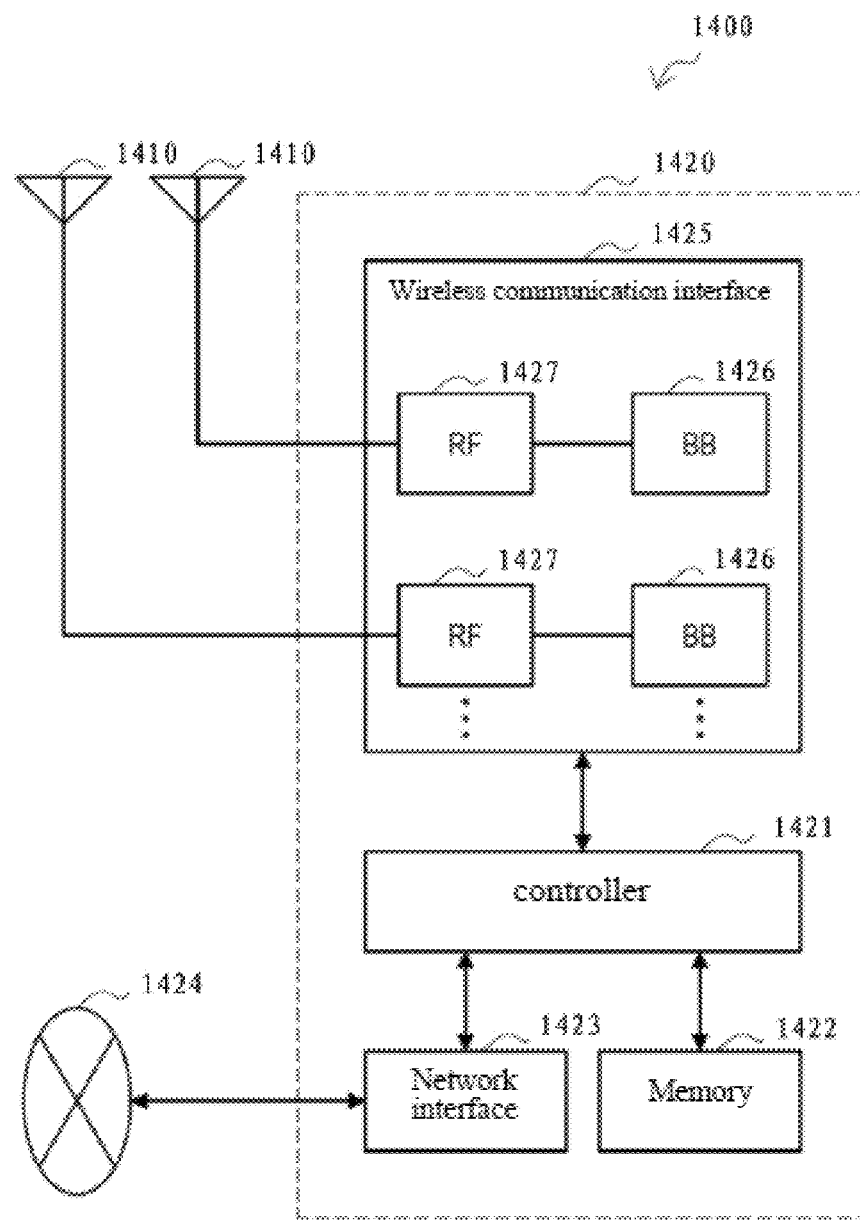
FIG. 20 illustrates a first example of schematic configuration of the base station according to the present disclosure.

FIG. 20 is a block diagram showing a first example of a schematic configuration of a base station to which the technology of the present disclosure can be applied. In FIG. 20, the base station is implemented as gNB 1400. The gNB 1400 includes a plurality of antennas 1410 and a base station device 1420. The base station device 1420 and each antenna 1410 may be connected to each other via an RF cable. In an implementation, the gNB 1400 (or the base station device 1420) herein may correspond to the above-mentioned electronic device 200, 300, 400 or 60.

The antennas 1410 includes multiple antenna elements, such as multiple antenna arrays for large-scale MIMO. The antennas 1410, for example, can be arranged into the antenna array matrix, and are used for the base station device 1420 to transmit and receive wireless signals. For example, multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 may include the processing circuitry 201, 301, 401, or 601 described above, perform the communication method described in FIG. 12B, 13B, 17B or 19B, or control various components of the electronic device 200, 300, 400, or 600. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424 (for example, 5G core network). The controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as 5G NR, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 20 illustrates an example in which one RF circuit 1427 is connected to one antenna 1410, the present disclosure is not limited to this illustration, but one RF circuit 1427 may be connected to multiple antennas 1410 at the same time.

As shown in FIG. 20, the wireless communication interface 1425 may include a plurality of BB processors 1426. For example, the plurality of BB processors 1426 may be compatible with multiple frequency bands used by gNB 1400. As shown in FIG. 20, the wireless communication interface 1425 may include a plurality of RF circuits 1427. For example, the plurality of RF circuits 1427 may be compatible with multiple antenna elements. Although FIG. 20 shows an example in which the wireless communication interface 1425 includes a plurality of BB processors 1426 and a plurality of RF circuits 1427, the wireless communication interface 1425 may also include a single BB processor 1426 or a single RF circuit 1427.

In the gNB 1400 illustrated in FIG. 20, one or more of the units included in the processing circuitry 201 described with reference to FIG. 12A, the processing circuitry 301 described with reference to FIG. 13A, the processing circuitry 401 described with reference to FIG. 17A or the processing circuitry 601 described with reference to FIG. 19A may be implemented in the radio communication interface 1425. Alternatively, at least a part of these components may be implemented in the controller 1421. As an example, the gNB 1400 includes a part (for example, the BB processor 1426) or the entire of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 21:
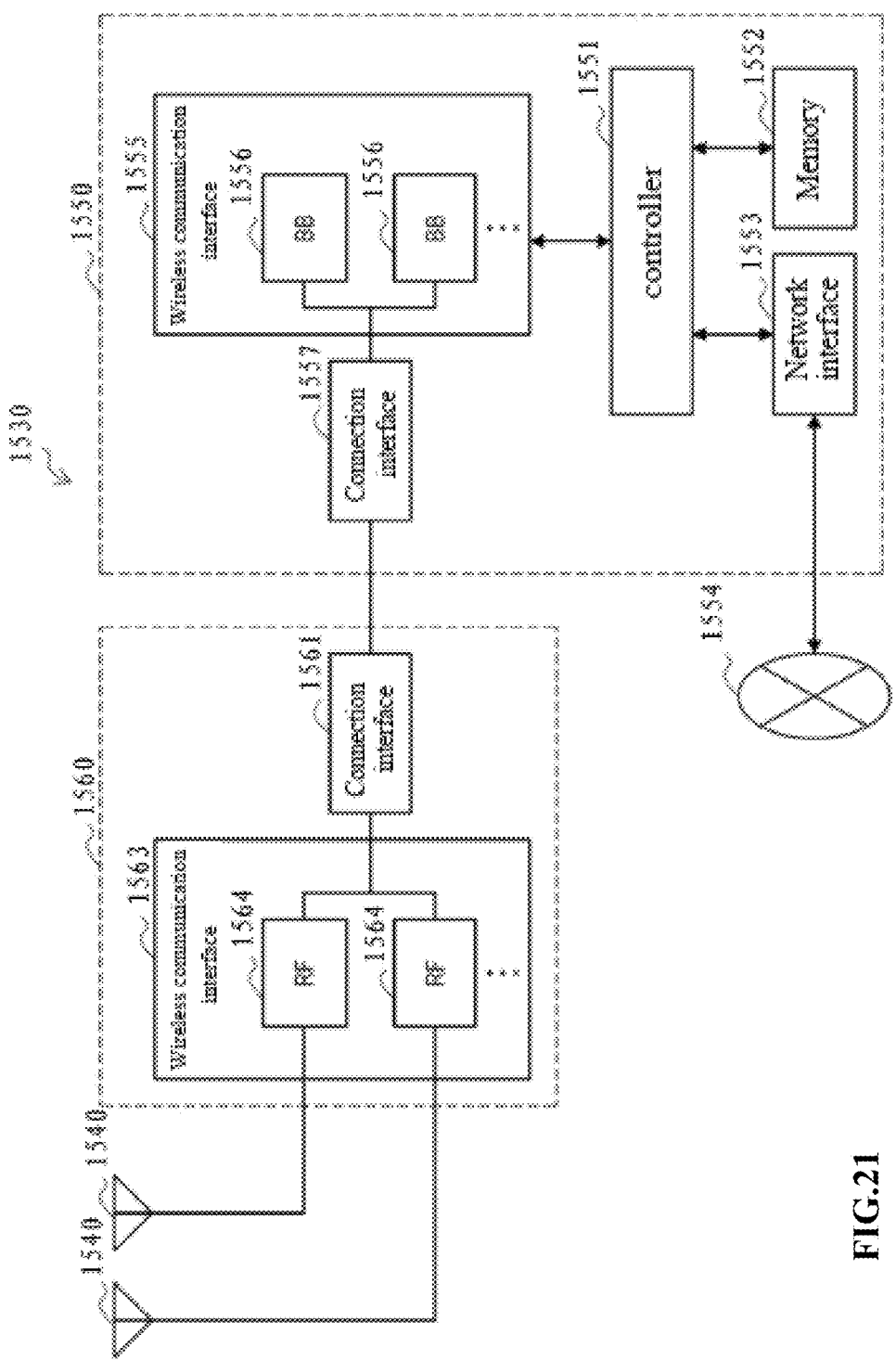
FIG. 21 illustrates a second example of schematic configuration of the base station according to the present disclosure.

FIG. 21 is a block diagram showing a second example of a schematic configuration of a base station to which the technology of the present disclosure can be applied. In FIG. 21, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic devices 200, 300, 400 or 600.

The antennas 1540 include multiple antenna elements, such as multiple antenna arrays for large-scale MIMO. The antennas 1540, for example, can be arranged into the antenna array matrix, and are used for the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 21.

The wireless communication interface 1555 supports any cellular communication scheme such as 5G NR, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 21 except that the BB processor 1556 is connected to the RF circuit 1564 of the RRH 1560 via the connection interface 1557. As shown in FIG. 21, the wireless communication interface 1555 may include a plurality of BB processors 1556. For example, multiple BB processors 1556 may be compatible with multiple frequency bands used by gNB 1530. Although FIG. 21 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 21 illustrates an example in which one RF circuit 1564 is connected to one antenna 1540, the present disclosure is not limited to this illustration, but one RF circuit 1564 may be connected to multiple antennas 1540 at the same time.

As shown in FIG. 21, the wireless communication interface 1563 may include a plurality of RF circuits 1564. For example, the plurality of RF circuits 1564 may support multiple antenna elements. Although FIG. 21 shows an example in which the wireless communication interface 1563 includes a plurality of RF circuits 1564, the wireless communication interface 1563 may include a single RF circuit 1564.

In the gNB 1500 shown in FIG. 21, one or more of units included in the processing circuitry 201 described with reference to FIG. 12A, the processing circuitry 301 described with reference to FIG. 13A, the processing circuitry 401 described with reference to FIG. 17A, or the processing circuitry 601 described with reference to FIG. 19A may be implemented in the wireless communication interface 1525. Alternatively, at least a part of these components may be implemented in the controller 1521. For example, the gNB 1500 includes a part (for example, the BB processor 1526) or the whole of the wireless communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the wireless communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of User Equipment

Figure 22:
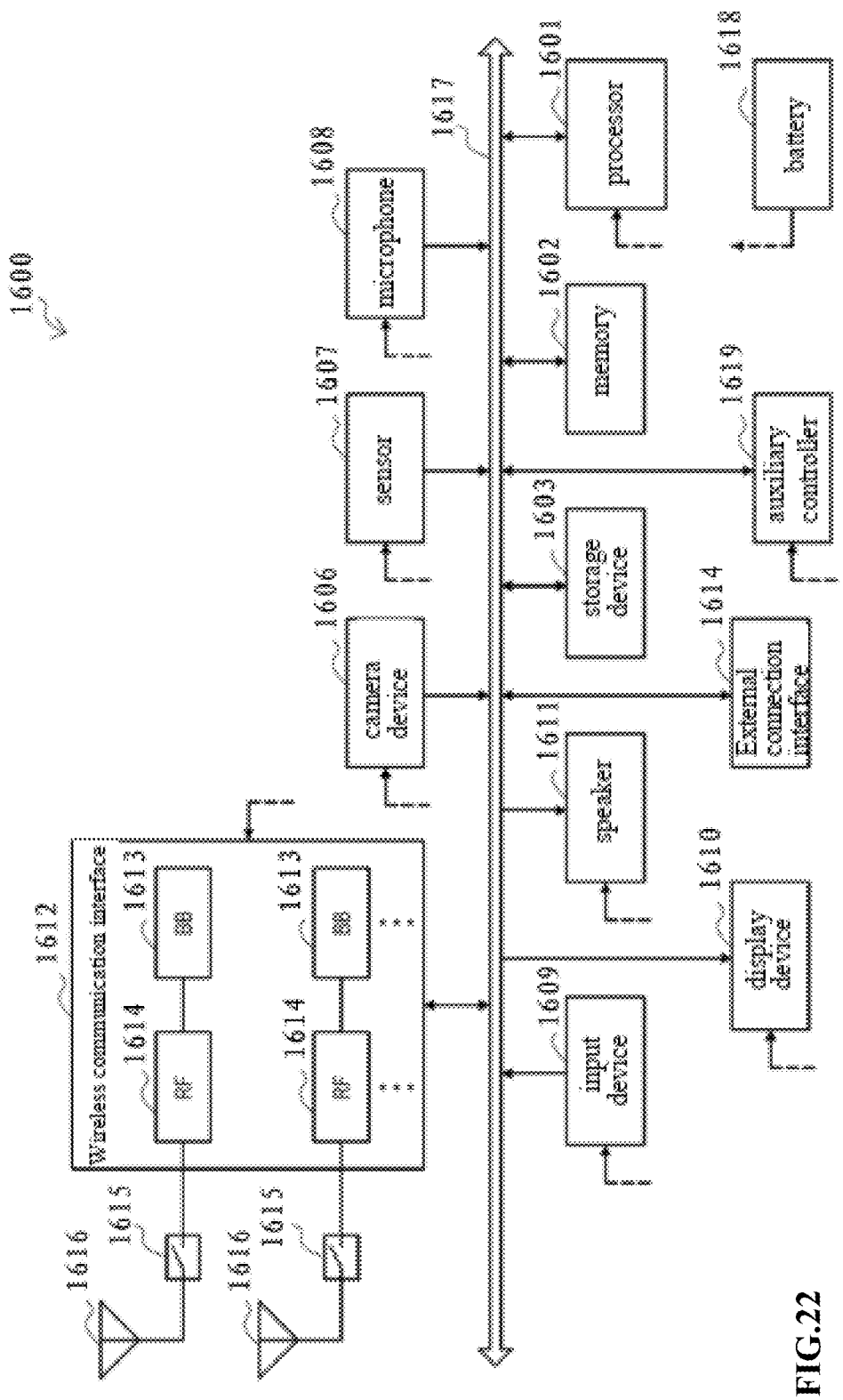
FIG. 22 illustrates an example of schematic configuration of a smart phone according to the present disclosure.

FIG. 22 is a block diagram showing an example of a schematic configuration of a smartphone 1600 to which the technology of the present disclosure can be applied. In an example, the smart phone 1600 may be implemented as the electronic device 100 described with reference to FIG. 11A, or the electronic device 500 described with reference to FIG. 18A.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The processor 1601 may include or serve as the processing circuitry 101 described with reference to FIG. 11A, or the processing circuitry 501 described with reference to FIG. 18A. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as 4G LTE, 5G NR or the like, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 22, the wireless communication interface 1612 may include multiple BB processors 1613 and multiple RF circuits 1614. Although FIG. 22 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

The antennas 1616 includes multiple antenna elements, such as multiple antenna arrays for large-scale MIMO. The antennas 1616, for example, can be arranged into the antenna array matrix, and are used for the wireless communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 22 via a feeder, and the feeder is partially shown as a dotted line in the figure. The auxiliary controller 1619 operates the minimum necessary functions of the smartphone 1600 in the sleep mode, for example.

In the smart phone 1600 shown in FIG. 22, one or more of units included in the processing circuitry 101 described with reference to FIG. 11A, or the processing circuitry 501 described with reference to FIG. 18A may be implemented in the wireless communication interface 1612. Alternatively, at least a part of these components may be implemented in the processor 1601 or the auxiliary controller 1619. As an example, the smart phone 1600 includes a part (for example, the BB processor 1613) or the whole of the wireless communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the wireless communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.

Second Application Example of User Equipment

Figure 23:
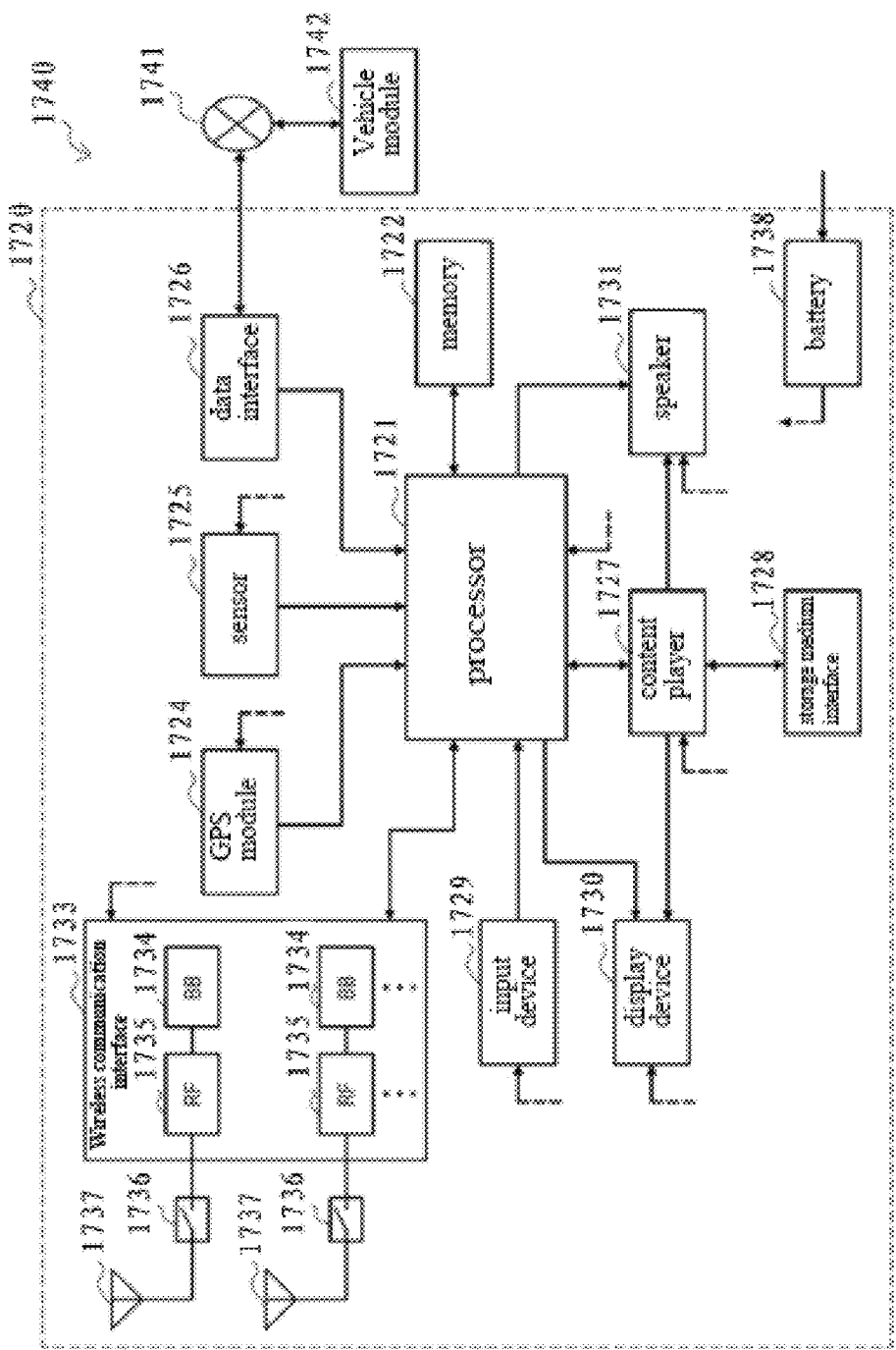
FIG. 23 illustrates an example of schematic configuration of an automobile navigation device according to the present disclosure.

FIG. 23 is a block diagram showing an example of a schematic configuration of a car navigation device 1720 to which the technology of the present disclosure can be applied. The car navigation device 1720 may be implemented as the electronic device 100 described with reference to FIG. 11A, or the electronic device 500 described with reference to FIG. 18A. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as 4G LTE or 5G NR, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 23, the wireless communication interface 1733 may include a plurality of BB processors 1734 and a plurality of RF circuits 1735. Although FIG. 23 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

The antennas 1737 includes multiple antenna elements, such as multiple antenna arrays for large-scale MIMO. The antennas 1737, for example, can be arranged into the antenna array matrix, and are used for the wireless communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 23 via a feeder, and the feeder is partially shown as a dotted line in the figure. The battery 1738 accumulates power provided from the vehicle.

In the car navigation device 1720 shown in FIG. 23, one or more of units included in the processing circuitry 101 described with reference to FIG. 11A, or the processing circuitry 501 described with reference to FIG. 18A can be implemented in the wireless communication interface 1733. Alternatively, at least a part of these components may be implemented in the processor 1721. As an example, the car navigation device 1720 includes a part (for example, the BB processor 1734) or the whole of the wireless communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the wireless communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

In addition, in the car navigation device 1720 shown in FIG. 23, for example, the communication unit 105 described with reference to FIG. 11A or the communication unit 505 described with reference to FIG. 18A may be implemented in the wireless communication interface 1933 (for example, the RF circuit 1935).

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device configured to operate as a user equipment, there being an access link between the user equipment and a first node of an integrated access and backhaul (IAB) system, the access link between the user equipment and the first node comprising an uplink access link between the user equipment and the first node and a downlink access link between the user equipment and the first node, there being a backhaul link between the first node and a second node of the IAB system, wherein the second node is a parent node of the first node in network topology of the IAB system, the electronic device comprising:
a processing circuitry configured to:
measure a signal interference from a third node and generate a corresponding interference measurement;
report the interference measurement to the first node; and
in a case where the second node makes a determination, based at least in part on the interference measurement exceeding a predetermined threshold, to switch the access link between the user equipment and the first node, establish a direct access link between the second node and the user equipment and disconnect the access link between the user equipment and the first node,
wherein disconnecting the access link between the user equipment and the first node comprises disconnecting only the downlink access link between the user equipment and the first node without disconnecting the uplink access link between the user equipment and the first node, and
wherein establishing the direct access link between the second node and the user equipment comprises establishing only a downlink access link between the second node and the user equipment without establishing an uplink access link between the user equipment and the second node.

2. The electronic device of claim 1, wherein the downlink access link between the second node and the user equipment and the uplink access link between the user equipment and the first node operate on different frequency bands.

3. The electronic device of claim 1,
wherein the interference measurement is compared with the predetermined threshold at the first node, or
wherein the interference measurement is forwarded to the second node by the first node, and is compared with the predetermined threshold at the second node.

4. The electronic device of claim 1, wherein measuring the signal interference from the third node includes:
receiving a non-zero-power channel state information reference signal (NZP-CSI-RS) transmitted by the third node; and
measuring a signal power of the received NZP-CSI-RS as the interference measurement.

5. The electronic device of claim 1, wherein the processing circuitry is further configured to calculate a gain of an optimal downlink quality during a beam training between the user equipment and the second node over a downlink quality of the access link between the user equipment and the first node, and report the gain to the second node.

6. An electronic device for a node in an integrated access and backhaul (IAB) system, the node being referred to as the first node, there being an access link between the first node and a user equipment, the access link between the user equipment and the first node comprising an uplink access link between the user equipment and the first node and a downlink access link between the user equipment and the first node, there being a backhaul link between the first node and a second node of the IAB system, where the second node is a parent node of the first node in network topology of the IAB system, characterized in the electronic device comprising:
a processing circuitry configured to:
receive, from the user equipment, an interference measurement of signal interference from a third node;
in a case where the second node makes a determination, based at least in part on the interference measurement exceeding a predetermined threshold, to switch the access link between the first node and the user equipment, receive from the second node an instruction to disconnect the access link between the first node and the user equipment, and
disconnect the access link between the first node and the user equipment,
wherein the instruction to disconnect the access link between the first node and the user equipment comprises an instruction to disconnect only the downlink access link between the first node and the user equipment without disconnecting the uplink access link between the first node and the user equipment
wherein disconnecting, the access link between the first node and the user equipment comprises disconnecting only the downlink access link between the first node and the user equipment without disconnecting the uplink access link between the first node and the user equipment.

7. The electronic device of claim 6,
wherein the processing circuitry is further configured to compare the received interference measurement with the predetermined threshold, and send a link switch attempt request to the second node to trigger the second node to make the determination to switch the access link used by the user equipment, or
wherein the processing circuitry is further configured to forward the received interference measurement to the second node for comparing with the predetermined threshold at the second node.

8. The electronic device of claim 6, wherein the processing circuitry is further configured to report to the second node the number of downlink DMRS ports $K_{B,N,j}^{DMRS}$ recommended to be configured for the backhaul link, the recommended number of downlink DMRS ports $K_{B,N,j}^{DMRS}$ is not greater than the number of DMRS ports $K_{A,N,j}^{DMRS}$ of all access links associated with the first node.

9. The electronic device of claim 6, wherein the processing circuitry is further configured to receive information including the number of downlink DMRS ports $K_{D,j}^{DMRS}$ configured by the second node for the backhaul link, where the configured number of downlink DMRS ports $K_{D,j}^{DMRS}$ is not greater than the number of downlink DMRS ports $K_{B,N,j}^{DMRS}$ commended by the first node to be configured for the backhaul link.

10. The electronic device of claim 6, wherein the downlink access link between the user equipment and the uplink access link between the user equipment and the first node operate on different frequency bands.

11. An electronic device for a node in an integrated access and backhaul (IAB) system, the node being referred to as a second node, there being a backhaul link between a first node and the second node of the IAB system, wherein the first node is a child node of the second node in network topology of the IAB system, and there is an access link between a user equipment and the first node, the access link between the user equipment and the first node comprising an uplink access link between the user equipment and the first node and a downlink access link between the user equipment and the first node, the electronic device comprising a processing circuitry configured to:
make a determination to switch the access link used by the user equipment based at least in part on an interference measurement of signal interference from a third node that is measured by the user equipment exceeding a predetermined threshold; and
in response to the determination, establish a direct access link between the second node and the user equipment and instruct the first node to disconnect the access link between the first node and the user equipment,
wherein the instruction to disconnect the access link between the first node and the user equipment comprises an instruction to disconnect only the downlink access link between the first node and the user equipment without disconnecting the uplink access link between the first node and the user equipment, and
wherein establishing the direct access link between the second node and the user equipment includes establishing only a downlink access link between the second node and the user equipment without establishing an uplink access link between the second node and the user equipment.

12. The electronic device of claim 11, wherein the processing circuitry is further configured to:
receive, from the user equipment, a gain of an optimal downlink quality during beam training between the user equipment and the second node over a downlink quality of the access link between the user equipment and the first node;
in a case where the gain exceeds a certain threshold, makes a determination to switch the access link used by the user equipment.

13. The electronic device of claim 11, wherein the processing circuitry is further configured to:
receive, from the user equipment, a first gain of an optimal downlink quality during beam training between the user equipment and the second node over a downlink quality of the access link between the user equipment and the first node;
receive, from a further user equipment, a second gain of an optimal downlink quality during beam training between the further user equipment and the second node over a downlink quality of the access link between the further user equipment and the third node, wherein the signal interference from the third node is caused by a downlink transmission between the third node and the further user equipment; and
in a case where the first gain exceeds the second gain, makes the determination to switch the access link used by the user equipment.

14. The electronic device of claim 11, wherein the downlink access link between the second node and the user equipment and the uplink access link between the user equipment and the first node operate on different frequency bands.

* * * * *